United States Patent
Park et al.

(10) Patent No.: US 12,309,804 B2
(45) Date of Patent: *May 20, 2025

(54) METHOD AND APPARATUS FOR LOW LATENCY AND HIGH RELIABILITY DATA TRANSMISSION IN WIRELESS COMMUNICATION SYSTEM

(71) Applicant: SAMSUNG ELECTRONICS CO., LTD., Suwon-si (KR)

(72) Inventors: Sungjin Park, Suwon-si (KR); Jinyoung Oh, Suwon-si (KR); Hyunseok Ryu, Suwon-si (KR); Jonghyun Bang, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,606

(22) Filed: Sep. 2, 2022

(65) Prior Publication Data

US 2023/0007637 A1    Jan. 5, 2023

Related U.S. Application Data

(63) Continuation of application No. 16/578,154, filed on Sep. 20, 2019, now Pat. No. 11,438,883.

(30) Foreign Application Priority Data

Sep. 21, 2018    (KR) .................. 10-2018-0114382

(51) Int. Cl.
*H04W 72/04*    (2023.01)
*H04L 5/00*    (2006.01)
(Continued)

(52) U.S. Cl.
CPC ............ *H04W 72/23* (2023.01); *H04L 5/0051* (2013.01); *H04L 5/0092* (2013.01); *H04L 5/10* (2013.01);
(Continued)

(58) Field of Classification Search
CPC ... H04L 5/0044; H04L 5/0051; H04L 5/0053; H04L 5/0091; H04L 5/0092; H04L 5/10;
(Continued)

(56) References Cited

U.S. PATENT DOCUMENTS 10,044,430 B2    8/2018    Park
10,880,880 B2*   12/2020   Ma ..................... H04W 72/23
(Continued)

FOREIGN PATENT DOCUMENTS

CN    102342035 A    2/2012
CN    103548409 A    1/2014
(Continued)

OTHER PUBLICATIONS

ZTE, "Remaining issues for data resource allocation", 3GPP TSG RAN WG1 Meeting #93, May 21-25, 2018, R1-1806134, 32 pages.
(Continued)

*Primary Examiner* — Mansour Oveissi

(57) ABSTRACT

An operating method of a user equipment (UE) for time domain resource assignment of a data channel in a wireless communication system, the operating method including: receiving control information related to the time domain resource assignment of the data channel from a base station via a physical downlink control channel (PDCCH) and upper layer signaling, and determining the time domain resource assignment of the data channel, based on the received control information.

15 Claims, 13 Drawing Sheets

(51) Int. Cl.
  *H04L 5/10*    (2006.01)
  *H04W 72/0446* (2023.01)
  *H04W 72/23*   (2023.01)
  *H04W 80/08*   (2009.01)

(52) U.S. Cl.
  CPC ....... *H04W 72/0446* (2013.01); *H04W 80/08* (2013.01)

(58) Field of Classification Search
  CPC .. H04W 72/0446; H04W 72/23; H04W 80/08
  See application file for complete search history.

(56) References Cited

U.S. PATENT DOCUMENTS

| | | | |
|---|---|---|---|
| 11,025,456 | B2 | 6/2021 | Chatterjee et al. |
| 2014/0050130 | A1 | 2/2014 | Kim et al. |
| 2014/0056244 | A1 | 2/2014 | Frenne et al. |
| 2014/0105158 | A1 | 4/2014 | Kim |
| 2018/0227777 | A1 | 8/2018 | Sun et al. |
| 2019/0312713 | A1* | 10/2019 | Yang ................... H04W 72/23 |
| 2019/0363824 | A1 | 11/2019 | Sun et al. |
| 2020/0008205 | A1* | 1/2020 | Wang ................... H04W 72/23 |
| 2021/0084647 | A1 | 3/2021 | Takeda et al. |
| 2021/0195618 | A1* | 6/2021 | Yuan .................. H04W 72/535 |
| 2021/0314107 | A1* | 10/2021 | Yoshioka .............. H04L 1/1819 |
| 2021/0377937 | A1* | 12/2021 | Takeda ................. H04W 72/20 |

FOREIGN PATENT DOCUMENTS

| | | |
|---|---|---|
| CN | 106686735 A | 5/2017 |
| CN | 107888338 A | 4/2018 |

OTHER PUBLICATIONS

MediaTek Inc., "Remaining Issues on DL/UL Resource Allocation", 3GPP TSG RAN WG1 #93, May 21-25, 2018, R1-1806815, 7 pages.
Nokia et al., "Remaining issues on resource allocation", 3GPP TSG RAN WG1 Meeting #93, May 21-25, 2018, R1-1807280, 12 pages.
LG Electronics, "Discussion on DL/UL data scheduling and HARQ procedure", 3GPP TSG RAN WG1 Meeting #94, Aug. 20-24, 2018, R1-1808492, 23 pages.
Notification of Transmittal of the International Search Report and The Written Opinion of the International Searching Authority, or the Declaration dated Jan. 10, 2020 in connection with International Patent Application No. PCT/KR2019/012329, 10 pages.
Supplementary European Search Report dated Oct. 12, 2021, in connection with European Application No. 19861454.7, 7 pages.
Ericsson, "Summary of 7.1.3.3.1 (resource allocation)," R1-1805505, TSG-RAN WG1 #92bis, Sanya, China, Apr. 16-20, 2018, 15 pages.
LG Electronics, "Remaining issues on resource allocation," R1-1801019, 3GPP TSG RAN WG1 Meeting AH 1801, Vancouver, Canada, Jan. 22-26, 2018, 8 pages.
LG Electronics, "Remaining issues on Resource allocation," R1-1804558, 3GPP TSG RAN WG1 Meeting 92bis, Sanya, China, Apr. 16-20, 2018, 4 pages.
European Patent Office, "Communication pursuant to Article 94(3) EPC," dated Feb. 21, 2023, in connection with European Patent Application No. 19861454.7, 6 pages.
Office Action dated Aug. 16, 2023, in connection with Korean Patent Application No. 10-2018-0114382, 8 pages.
Office Action dated Oct. 17, 2023, in connection with Chinese Patent Application No. 201980075639.7, 46 pages.
Office Action issued Feb. 26, 2024, in connection with Korean Patent Application No. 10-2018-0114382, 5 pages.
Notice Of Allowance issued Mar. 9, 2024, in connection with Chinese Patent Application No. 201980075639.7, 7 pages.
Communication under Rule 71(3) EPC dated Jul. 8, 2024, in connection with European Patent Application No. 19 861 454.7, 71 pages.
Office Action issued Jun. 21, 2024, in connection with Korean Patent Application No. 10-2018-0114382, 5 pages.

* cited by examiner

METHOD AND APPARATUS FOR LOW LATENCY AND HIGH RELIABILITY DATA TRANSMISSION IN WIRELESS COMMUNICATION SYSTEM

CROSS-REFERENCE TO RELATED APPLICATIONS

This application is a continuation of application Ser. No. 16/578,154, now U.S. Pat. No. 11,438,883 which issued Sep. 6, 2022, which is based on and claims priority under 35 U.S.C. § 119 to Korean Patent Application No. 10-2018-0114382, filed Sep. 21, 2018, in the Korean intellectual Property Office, the disclosures of which are incorporated by reference herein in their entirety.

BACKGROUND

1. Field

The disclosure relates to a data resource assigning method and apparatus for low latency and high reliability data transmission in a wireless communication system.

2. Description of Related Art

To meet the increase in demand for wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' A 5G communication system defined by 3GPP is referred to as a new radio (NR) system. In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies are being studied, for example: beam-forming, massive multiple-input multiple-output (MIMO), Full Dimensional MIMO (FD-MIMO), array antennas, analog beam-forming, and large-scale antennas, and such technologies have been applied to NR systems. In order to improve system networks for 5G communication systems, various technologies have been developed, e.g., evolved small cells, advanced small cells, cloud radio access networks (Cloud-RAN), ultra-dense networks, Device-to-Device communication (D2D), wireless backhaul, moving networks, cooperative communication, Coordinated Multi-Points (COMP), and interference cancellation. Also, for 5G communication systems, other technologies have been developed, e.g., hybrid frequency-shift keying (FSK) and quadrature amplitude modulation (QAM) (FQAM) and Sliding Window Superposition Coding (SWSC), which are Advanced Coding Modulation (ACM) schemes, and filter Bank Multi Carrier (FBMC), non-orthogonal multiple access (NOMA), and sparse code multiple access (SCMA), which are advanced access schemes.

The Internet has evolved from a human-based connection network, where humans create and consume information, to the Internet of Things (IoT), where distributed configurations, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, Machine to Machine (M2M) communication, Machine Type Communication (MTC), etc. have been studied. In the IoT environment, intelligent Internet Technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As described above, various services may be provided due to the development of wireless communication systems, and thus, ways of effectively providing such services are required.

SUMMARY

One or more embodiments of the disclosure effectively provide a service in a wireless communication system.

Additional aspects will be set forth in part in the description which follows and, in part, will be apparent from the description, or may be learned by practice of the presented embodiments of the disclosure.

According to an embodiment of the disclosure, an operating method of a user equipment (UE) for time domain resource assignment of a data channel in a wireless communication system includes: receiving control information related to the time domain resource assignment of the data channel from a base station via a physical downlink control channel (PDCCH) and upper layer signaling; and determining the time domain resource assignment of the data channel, based on the received control information, wherein the control information received via the PDCCH includes downlink control information (DCI) indicating the time domain resource assignment of the data channel. According to another embodiment of the disclosure, an operating method of a base station for time domain resource assignment of a data channel in a wireless communication system includes: performing scheduling for the time domain resource assignment of the data channel; and transmitting control information related to the time domain resource assignment of the data channel to a user equipment (UE) via physical downlink control channel (PDCCH) and upper layer signaling.

According to another embodiment of the disclosure, a user equipment (UE) of a wireless communication system includes: a transceiver configured to transmit and receive a signal with a base station; a memory storing a program for time domain resource assignment of a data channel; and a processor configured to execute the program stored in the memory to receive control information related to the time domain resource assignment of the data channel from the base station via physical downlink control channel (PDCCH) and upper layer signaling, and determine the time domain resource assignment of the data channel based on the received control information, wherein the control information received via the PDCCH includes downlink control information (DCI) indicating the time domain resource assignment of the data channel.

According to another embodiment of the disclosure, a base station of a wireless communication system includes: a transceiver configured to transmit and receive a signal with a user equipment (UE); a memory storing a program for time domain resource assignment of a data channel; and a processor configured to execute the program stored in the memory to perform scheduling for the time domain resource assignment of the data channel, and transmit control information related to the time domain resource assignment of the data channel to the UE via a physical downlink control channel (PDCCH) and upper layer signaling.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals, A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
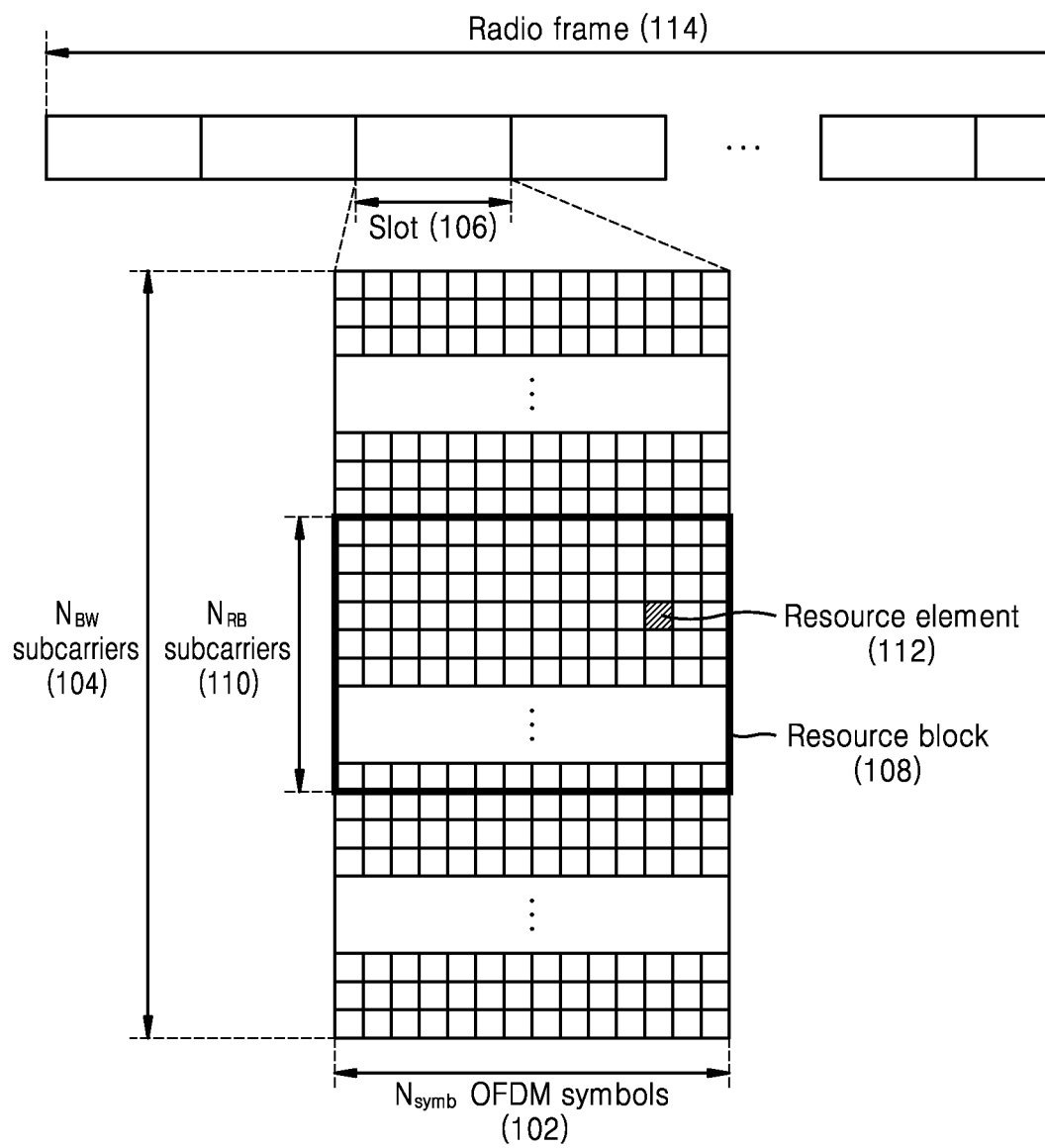
FIG. 1 illustrates a diagram showing a transmission structure of a time-frequency domain that is a wireless resource region of a 5th generation (5G) or new ratio (NR) system.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, one or more embodiments of the disclosure will be described in detail with reference to the accompanying drawings.

In describing the embodiments of the disclosure, descriptions of technical contents that are well known in the technical field to which the disclosure belongs and are not directly related to the disclosure will be omitted. By omitting unnecessary description, the subject matter of the disclosure may be further clearly conveyed without being obscured.

For the same reasons, components may be exaggerated, omitted, or schematically illustrated in drawings for clarity. Also, the size of each component does not completely reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, the present embodiments of the disclosure may have different forms and should not be construed as being limited to the descriptions set forth herein. Rather, these embodiments of the disclosure are provided so that this disclosure will be thorough and complete and will fully convey the concept of the present embodiments of the disclosure to one of ordinary skill in the art, and the disclosure will only be defined by the appended claims.

Here, it will be understood that combinations of blocks in flowcharts or process flow diagrams may be performed by computer program instructions, Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Throughout the disclosure, the expression "at least one of a, b or c" indicates only a, only b, only c, both a and b, both a and c, both b and c, all of a, b, and c, or variations thereof.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-advanced (LTE-A) of the 3GPP, high rate packet data (HRPD) and ultra mobile broadband (UMB) of 3GPP2, IEEE 802.16e or the like. Also, a 5th generation (5G) or new radio (NR) communication standard is being developed as a 5G wireless communication system.

As a representative example of a broadband wireless communication system, an orthogonal frequency division multiplexing (OFDM) scheme is adopted for downlink (DL) or uplink (UL) of a 5G or NR system. More specifically, a cyclic-prefix OFDM (CP-OFDM) scheme is adopted for the DL, and a discrete fourier transform spreading OFDM (DFT-S-OFDM) scheme is adopted for the UL in addition to the CP-OFDM scheme. The UL refers to a radio link through which a terminal (a user equipment (UE) or a mobile station (MS)) transmits data or a control signal to a base station (BS) (e.g, gNode B or eNode B), and the DL refers to a radio link through which a base station transmits data or a control signal to a UE. Such a multiple access scheme may generally assign and operate time-frequency resources including data or control information to be transmitted to each other to prevent the time-frequency resources from overlapping with each other, that is, establish orthogonality, thereby distinguishing the data or the control information of each user.

The 5G or NR system adopts a hybrid automatic repeat request (HARQ) scheme in which the data is retransmitted in a physical layer when a decoding failure occurs in initial transmission. In the HARQ scheme, when a receiver does not correctly decode the data, the receiver transmits negative acknowledgement (NACK) informing a transmitter of the decoding failure such that the transmitter retransmits the corresponding data in the physical layer. The receiver combines the data retransmitted by the transmitter with data of which decoding failed previously to improve data reception performance. In addition, when the receiver correctly decodes the data, the transmitter may transmit acknowledgment (ACK) informing the transmitter of the decoding success such that the transmitter may transmit new data.

Meanwhile, an NR access technology system that is new 5G communication is designed to allow various services to be freely multiplexed in time and frequency resources, and accordingly, reference signals such as waveform/numerology may dynamically or freely assigned as required by the service. In order to provide an optimal service to the UE in wireless communication, optimized data transmission by measuring channel quality and an interference amount is important. Therefore, accurate channel state measurement is essential. However, unlike 4G communication, in which channel and interference characteristics do not change significantly according to frequency resources, frequency and interference characteristics of 5G or NR channels change significantly according to service, and thus support of a subset in a level of a frequency resource group (FRG) capable of dividing and measuring the channel and interference characteristics is required. Meanwhile, a type of service supported in the 5G or NR system may be divided into categories, such as enhanced mobile broadband (eMBB), massive machine type communications (mMTC), and ultra-reliable and low-latency communications (URLLC). The eMBB is a service targeting high speed data transmission of large capacity data, the mMTC is a service targeting UE power minimization and access to multiple UEs, and the URLLC is a service targeting high reliability and low latency. Different requirements may be applied depending on the type of service applied to the UE.

Among the above services, because the URLLC aims at high reliability and low latency, there may be a need to transmit control information and data information that is transmittable on a physical channel at a low coding rate. In case of the control information, a control information repetitive transmission function is already introduced to an MTC or narrow band Internet-of-Things (NB-IoT) service of LTE. The control information repetitive transmission function is introduced to provide high coverage for UEs having a small bandwidth, but a delay time is not sufficiently considered. Also, a minimum unit of a control information repetitive transmission is fixed to a subframe unit based on LTE. In order for the NR or 5G system to support the URLLC, a control information repetitive transmission mode needs to be introduced to increase reliability while requesting a low latency time. Accordingly, in the disclosure, a situation in which control information is repeatedly transmitted in a slot is basically considered. In addition, a situation in which control information is repeatedly transmitted over a slot boundary is also considered. Via an operation provided in the disclosure, a UE may detect control information transmitted from a base station quickly and with high reliability.

Also, terms used below are defined in consideration of functions in the disclosure, and may have different meanings according to an intention of a user or operator, customs, or the like. Thus, the terms should be defined based on the description throughout the specification. In the disclosure, a controller may also be referred to as a processor.

Throughout the specification, a layer (or a layer apparatus) may also be referred to as an entity. Hereinafter, a base station is an entity that assigns resources of a terminal, and may be at least one of a gNode (gNB), an eNode B (eNB), a node B (NB), a BS, a wireless access unit, a base station controller, or a node on a network. Examples of a terminal may include a UE, an MS, a cellular phone, a smartphone, a computer, and a multimedia system capable of performing a communication function. In the disclosure, a is a wireless transmission path of a signal transmitted from a base station to a UE, and an UL is a wireless transmission path of a signal transmitted from a UE to a base station. Also, hereinafter, the disclosure is described with an example of an NR system, but is not limited thereto and embodiments of the disclosure may be applied to other various communication systems having a similar technical background or a similar channel form. Also, it will be understood by one of ordinary skill in the art that embodiments of the disclosure may be applied to other communication systems through some modifications without departing from the scope of the disclosure.

In the disclosure, general terms 'physical channel' and 'signal' may be used interchangeably with data or a control signal. For example, a physical downlink shared channel (PDSCH) is a physical channel through which data is transmitted, but in the disclosure, PDSCH may also be the data.

In the disclosure, upper layer signaling is a method of transmitting a signal from a base station to a UE by using a DL data channel of a physical layer or from a UE to a base station by using an UL data channel of a physical layer, and may also be referred to as radio resource control (RRC) signaling or media access control (MAC) control element (CE).

Meanwhile, as the research on a next generation mobile communication system has been progressed recently, various methods for scheduling communication with a UE have been discussed. Accordingly, effective scheduling and data transmitting and receiving methods considering characteristics of the next generation communication system are required. In this regard, in order to provide a plurality of services to a user in a communication system, a method of providing each service within the same time period according to characteristics of the service and an apparatus using the method are required.

FIG. 1 illustrates a diagram showing a transmission structure of a time-frequency domain that is a wireless resource region of a 5G or NR system.

Referring to FIG. 1, in a wireless resource region, a horizontal axis denotes a time domain and a vertical axis denotes a frequency domain. In the time domain a minimum transmission unit is an OFDM symbol and $N_{symb}$ OFDM symbols 102 form one slot 106. The length of subframe may be defined as 1.0 ms and the length of radio frame 114 may be defined as 10 ms. In the frequency domain, a minimum transmission unit is a subcarrier, and the bandwidth of an entire system transmission bandwidth may include total $N_{BW}$ subcarriers 104. However, the specific numerical value may vary according to systems.

A basic unit of a time-frequency resource region is a resource element (RE) 112, and may be indicated by an OFDM symbol index and a subcarrier index. A resource block (RB) 108 or a physical resource block (PRB) may be defined as the consecutive $N_{symb}$ OFDM symbols 102 in the time domain and as consecutive $N_{RB}$ subcarriers 110 in the frequency domain. Accordingly, one RB 108 may include $N_{symb} \times N_{RB}$ REs 112.

Generally, a minimum transmission unit of data is an RB unit. Generally, in the 5G or NR system, $N_{symb}=14$, $N_{RB}=12$, and $N_{BW}$ and $N_{RB}$ may be proportional to the bandwidth of the system transmission bandwidth. A data rate increases in proportion to the number of RBs scheduled to a UE. In the 5G or NR system, a DL transmission bandwidth and an UL transmission bandwidth may be different from each other in case of a frequency division duplexing (FDD) system operating by distinguishing a DL and an UP in frequencies. A channel bandwidth indicates a radio frequency (RF) corresponding to the system transmission bandwidth. Table 1 below shows a correspondence between the system transmission bandwidth and the channel bandwidth defined in an LTE system that is 4G wireless communication before the 5G or NR system. For example, the LTE system of a 10 MHz channel bandwidth includes 50 RBs for a transmission bandwidth.

TABLE 1

| | Channel Bandwidth BW$_{Channel}$ [MHz] | | | | | |
|---|---|---|---|---|---|---|
| | 1.4 | 3 | 5 | 10 | 15 | 20 |
| Transmission Bandwidth Configuration NRB | 6 | 15 | 25 | 50 | 75 | 100 |

The 5G or NR system may operate in a channel bandwidth greater than that of LTE suggested in Table 1. Table 2 shows a correspondence between the system transmission bandwidth, the channel bandwidth, and subcarrier spacing (SCS) in the 5G or NR system.

TABLE 2

| | SCS | Channel Bandwidth BW$_{Channel}$ [MHz] | | | | | | | | | |
|---|---|---|---|---|---|---|---|---|---|---|---|
| | [kHz] | 5 | 10 | 15 | 20 | 25 | 40 | 50 | 60 | 80 | 100 |
| Maximum Transmission Bandwidth N$_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information regarding DL data or UL data is transmitted from the base station to the UE via DL control information (DCI). The DCI is defined according to various formats, and each format may indicate whether the scheduling information is scheduling information regarding UL data (UL grant) or regarding DL link (DL grant), whether the DCI is compact DCI in which the size of control information is small, whether spatial multiplexing using multiple antennas is applied, and whether the DCI is DCI for power control. For example, DC format 1-1 that is the scheduling information regarding DL data (DL grant) may include one of following pieces of control information.

Carrier indicator: indicates on which frequency carrier the scheduled data is transmitted.

DCI format indicator: indicates whether the DCI is for DL or UL.

Bandwidth part (BWP) indicator: indicates from which BWP the scheduled data is transmitted.

Frequency domain resource assignment: indicates an RB of a frequency domain assigned for data transmission. A resource to be expressed is determined according to a system bandwidth and a resource assigning method.

Time domain resource assignment: indicates in which OFDM symbol of which slot a data-related channel is to be transmitted.

Virtual RB (VRB)-to-physical RB (PRB): indicates how to map a VRB index and a PRB index.

Modulation and coding scheme (MCS): indicates a modulation scheme and a coding rate used in data transmission. In other words, a coding rate value for indicating a transport block size (TBS) and channel coding information together with information indicating quadrature phase shift keying (QPSK), 16 quadrature amplitude modulation (16QAM), 64QAM, or 256QAM may be indicated.

Code block group (CBG) transmission information: indicates information about which CBG is transmitted when CBG retransmission is configured.

HARQ process number: indicates a process number of HARQ.

New data indicator: indicates whether HARQ is initial transmission or retransmission.

Redundant version: indicates a redundancy version of HARQ.

Transmit power control (TPC) command for physical UL control channel (PUCCH): indicates a TPC command regarding PUCCH that is an UL control channel.

In case of the PUSCH transmission described above, the time domain resource assignment may be transmitted via information about a slot in which PUSCH is transmitted, and a start OFDM symbol position S in the corresponding slot and the number L of OFDM symbols to which the PUSCH is mapped. The S may indicate a relative position from the start of the slot and the L may indicate the number of consecutive OFDM symbols, wherein the S and the L may be determined from a start and length indicator value (SLIV) defined as follows.

If (L−1)≤7 then
SLIV=14·(L−1)+S
else
SLIV=14·(14−L+1)+(14−1−S)
where 0<L≤14-S

In the 5G or NR system, a table including an SLIV and a PUSCH mapping type, and information about a slot through which PUSCH is transmitted may be configured in one row via RRC configuration in general. Then, the base station may transmit, to the UE, the SLIV, the PUSCH mapping type, and the information about the slot through which PUSCH is transmitted when an index value in the configured table is indicated during the time domain resource assignment of the DCI.

In the 5G or NR system, a type A and a type B are defined as the PUSCH mapping type. In the PUSCH mapping type A, a first OFDM symbol among DMRS OFDM symbols is positioned in a second or third OFDM symbol of a slot. In the PUSCH mapping type B, the first OFDM symbol among the DMRS OFDM symbols is positioned in a first OFDM symbol in the time domain resource assigned via PUSCH transmission. The PUSCH time domain resource assignment method described above may be identically applied to PDSCH time domain resource assignment.

The DCI may be transmitted on a physical DL control channel (PDCCH) (or a control information, hereinafter used interchangeably) that is a DL physical control channel via channel coding and modulation scheme.

Generally, the DCI is added to cyclic redundancy check (CRC) by being scrambled to a certain radio network temporary identifier (RNTI) (or a UE identifier) independently for each UE, channel-coded, and then transmitted by being configured as an independent PDCCH, The PDCCH is mapped and transmitted via a control resource set (CORE-SET) configured to the UE.

The DL data may be transmitted on a PDSCH that is a physical channel for DL data transmission. The PDSCH may be transmitted after a control channel transmission section, and scheduling information such as a particular mapping position in a frequency domain, a modulation scheme, and the like is determined based on the DCI transmitted via the PDCCH.

Among the control information configuring the DCI, the base station notifies the UE of a TBS of data to be transmitted and a modulation scheme applied to the PDSCH to be transmitted via MCS. According to an embodiment of the disclosure, the MCS may include 5 bits, or more or less than 5 bits. The TBS corresponds to a size before channel coding for error correction is applied to the data (TB) to be transmitted by the base station.

In the disclosure, the TB may include a medium access control (MAC) header, an MAC control element (CE), one or more MAC service data units (SDUs), and padding bits. Alternatively, the TB may indicate a unit or MAC protocol data unit (PDU) of data transmitted from an MAC layer to a physical layer.

The modulation scheme supported in the 5G or NR system is QPSK, 16QAM, 64QAM, and 256QAM, wherein modulation orders (Qm) thereof respectively correspond to 2, 4, 6, and 8. In other words, 2 bits per symbol for QPSK modulation, 4 bits per OFDM symbol for 16QAM, and 6 bits per symbol for 64QAM may be transmitted, and 8 bits per symbol may be transmitted for 256QAM.

In the 5G or NR system, when the UE is scheduled for the PDSCH or the PUSCH via the DCI and a time resource assignment field index m included in the DCI is indicated, a combination of DMRS type A position information corresponding to m+1, PDSCH mapping type information, a slot index $K_0$, a data resource start symbol S, and a data resource assignment length L is indicated from a table showing time domain resource assignment information. For example, Table 3 is a table including time domain resource assignment information.

TABLE 3

Normal cyclic prefix based PDSCH time domain resource assignment

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 6 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position where DMRS is transmitted in one slot indicated by a system information block (SIB) that is one of UE common control information. A possible value in the field is 2 or 3. When the total number of symbols configuring one slot is 14 and a first symbol index is 0, 2 indicates a third symbol and 3 indicates a fourth symbol.

In Table 3, PDSCH mapping type is information indicating a position of DMRS in a scheduled data resource region. When the PDSCH mapping type is A, the DMRS is transmitted or received at a symbol position always determined via dmrs-typeA-Position regardless of an assigned data time domain resource. When the PDSCH mapping type is B, the DMRS is always transmitted or received in a first symbol among an assigned data time domain resource. In other words, the PDSCH mapping type B does not use information of dmrs-typeA-Position.

In Table 3, $K_0$ indicates an offset of a slot index to which PDCCH through which the DCI is transmitted belongs and a slot index to which PDSCH or PUSCH scheduled in the DCI belongs. For example, when the slot index of PDCCH is n, the slot index of PDSCH or PUSCH scheduled by the DCI of PDCCH is n+$K_0$. In Table 3, S denotes a start symbol index of a data time domain resource in one slot. The range of S is 0 to 13 based on a normal cyclic prefix. In Table 3, L denotes a data time domain resource section length in one slot. The range of L is 1 to 14. However, possible values of S and L may be determined according to Equation 1 and Table 4 or 5.

Table 3 may be values used by the UE as default before time resource assignment information is received via UE specific or UE common upper layer signaling. For example, a DCI format 0_0 or 1_0 may always use Table 3 as a default time resource region value.

Table 3 indicates a PDSCH time domain resource assignment value, and $K_2$ is used instead of $K_0$ for PUSCH time domain resource assignment. Table 3-1 below is an example of a PUSCH time domain resource assignment table.

TABLE 3-1

Normal cyclic prefix based PUSCH time domain resource assignment

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

If $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$    Equation 1

Table 4 below is a table showing a possible combination of S and L based on whether cyclic prefix is normal or extended and whether the PDSCH mapping type is type A or type B.

TABLE 4

Combination of S and L capable of PDSCH time domain resource assignment

| PDSCH mapping type | Normal cyclic prefix | | | Extended cyclic prefix | | |
|---|---|---|---|---|---|---|
| | S | L | S + L | S | L | S + L |
| Type A | (0, 1, 2, 3) (Note 1) | (3, . . . , 14) | (3, . . . , 14) | (0, 1, 2, 3) (Note 1) | (3, . . . , 12) | (3, . . . , 12) |
| Type B | (0, . . . , 12) | (2, 4, 7) | (2, . . . , 14) | (0, . . . , 10) | (2, 4, 6) | (2, . . . , 12) |

Note 1:
S = 3 is applicable only if dmrs – TypeA – Position = 3

Table 5 below is a table showing a possible combination of S and L based on whether cyclic prefix is normal or extended and whether the PUSCH mapping type is type A or Type B.

TABLE 5

Combination of S and L capable of PUSCH time domain resource assignment

| PUSCH mapping type | Normal cyclic prefix | | | Extended cyclic prefix | | |
|---|---|---|---|---|---|---|
| | S | L | S + L | S | L | S + L |
| Type A | 0 | (4, . . . , 14) | (4, . . . , 14) | 0 | (4, . . . , 12) | (4, . . . , 12) |
| Type B | (0, . . . , 13) | (1, . . . , 14) | (1, . . . , 14) | (0, . . . , 12) | (1, . . . , 12) | (1, . . . , 12) |

Each index in Table 3 and Table 3-1 may be configured via upper layer signaling parameter PDSCH-TimeDomainResourceAllocationList or PUSCH-TimeDomainResourceAllocationList.

PDSCH-TimeDomainResourceAllocationList includes one or more upper layer signaling parameters PDSCH-TimeDomainResourceAllocation, and PDSCH-TimeDomainResourceAllocation includes k0, mappingtype, and startSymbolAndLength. The range of k0 is 0 to 32. Mappingtype may be type A or type B. The range of StartSymbolAndLength may be 0 to 127. As described above, when mappingtype is type A, a symbol position of DMRS follows a value indicated in dmrs-typeA-Position.

PUSCH-TimeDomainResourceAllocationList includes one or more upper layer signaling parameters PUSCH-TimeDomainResourceAllocation, and PUSCH-TimeDomainResourceAllocation includes k2, mapping type, and startSymbolAndLength. The range of k2 is 0 to 32. Mappingtype may be type A or type B. The range of StartSymbolAndLength may be 0 to 127. As described above, when mappingtype is type A, a symbol position of DMRS follows a value indicated in dims-typeA-Position.

The PDSCH-TimeDomainResourceAllocation or the PUSCH-TimeDomainResource Allocation is a time domain resource assignment method of PDSCH or PUSCH in one slot. The upper layer signaling aggregationFactorDL denotes the number of slots in which a value of PDSCH-TimeDomainResourceAllocation applied to one slot is repeatedly transmitted. The upper layer signaling aggregationFactorUL denotes the number of slots in which a value of PUSCH-TimeDomainResourceAllocation applied to one slot is repeatedly transmitted. The ranges of aggregationFactorDL and aggregationFactorUL are {1,2,4,8}. For example, when the aggregationFactorDL is 8, one of the possible values of PDSCH-TimeDomainResourceAllocation is repeatedly transmitted over total 8 slots. However, when at least some of symbols among the symbols applied to PDSCH-TimeDomainResourceAllocation in a certain slot are UL symbols, PDSCH transmission and reception of the certain slot is omitted. Similarly, when at least some symbols among the symbols applied to PUSCH-TimeDomainResourceAllocation in a certain slot are DL symbols, PUSCH transmission and reception of the certain slot is omitted.

Figure 2:
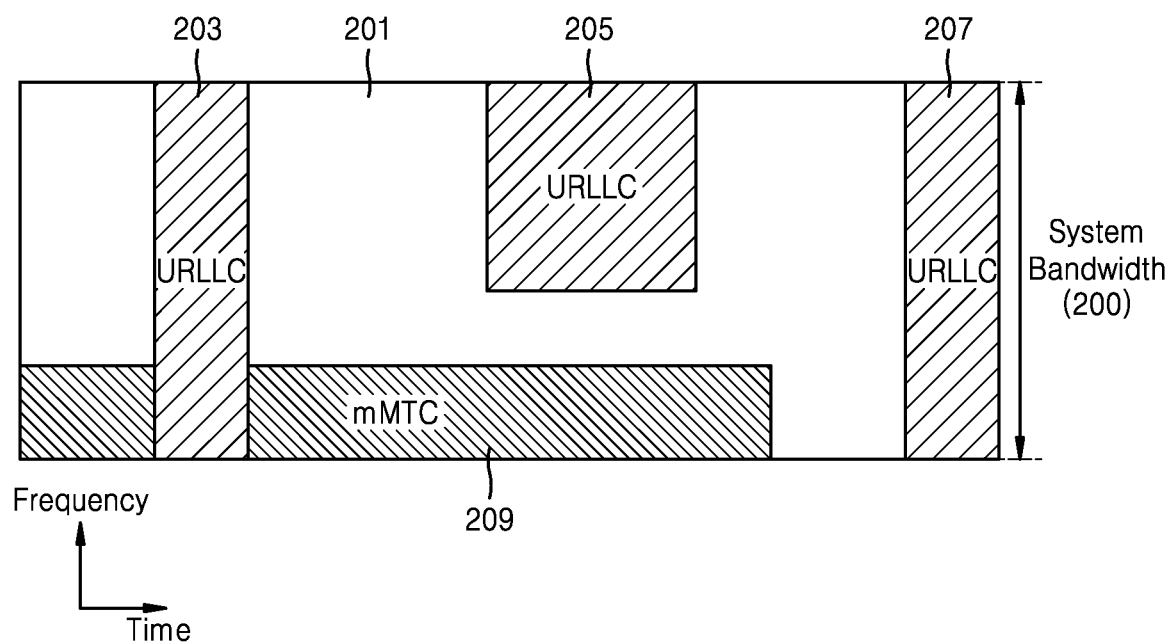
FIG. 2 illustrates a diagram for describing a method of assigning enhanced mobile broadband (eMBB) data, ultra-reliable and low-latency communications (URLLC) data, and massive machine type communications (mMTC) data in a time-frequency resource region in a 5G or NR system.

FIG. 2 illustrates a diagram for describing a method of assigning eMBB data 201, URLLC data 203, 205, and 207, and mMTC data 209 in a time-frequency resource region in a 5G or NR system.

Referring to FIG. 2, the eMBB data 201, the URLLC data 203, 205, and 207, and the mMTC data 209 may be assigned in a system bandwidth 200, When the URLLC data 203, 205 and 207 are generated and need to be transmitted while the eMBB data 201 and the mMTC data 209 are assigned and transmitted in a certain frequency band, the URLLC data 203, 205 and 207 may be transmitted without having to empty a region where the eMBB data 201 and the mMTC data 209 are already assigned or not transmit the eMBB data 201 or the mMTC data 209. In the above services, because the URLLC data 203, 205, and 207 need to reduce delay time, the URLLC data 203, 205, and 207 are assigned and transmitted to a portion of a resource to which the eMbB data 201 or the mMTC data 209 are assigned. When the URLLC data 203, 205, and 207 are additionally assigned and transmitted in the resource to which the eMBB data 201 is assigned, the eMBB data 201 may not be transmitted in a redundant time-frequency resource, and thus transmission performance of the eMBB data 201 may be decreased. In other words, eMBB data transmission failure may occur due to URCCL data assignment.

Figure 3:
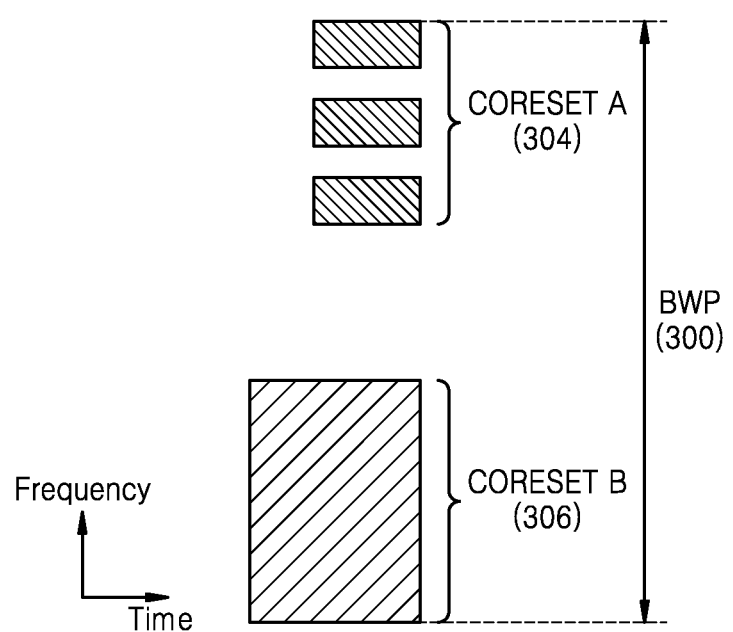
FIG. 3 illustrates a diagram for describing a control resource set (CORESET) in a 5G or NR system.

FIG. 3 illustrates a diagram for describing a CORESET in a 5G or NR system.

In an NR or 5G system, a UE may receive configuration of up to 4 CORESETs within one activated BWP. To receive the configuration of CORESET, following configuration information may be set via upper layer signaling.

ControlResourceSetId: ID assigned to CORESET frequencyDomainResources: field indicating frequency resource region of CORESET, assigned in a bitmap manner of 6 RB units duration: field indicating time domain resource of CORESET, includes consecutive symbols cce-REG-MappingType: field indicating how CCE including 6 REGs is mapped, includes interleaved method and non-interleaved method precodergranularity: field indicating whether same preceding; is applied in narrow band unit (for example, REG bundle) or in wide band unit (for example, all RBs of BWP)

tci related parameters: field indicating QCL information pdcch-DMRS-ScramblingID: field indicating scrambling information of DMRS included in PDCCH A UE receives CORESET configuration information including such configuration information. Referring to FIG. 3, two CORESET types are configured in an activated BWP 300. A CORESET A 304 shows a situation where CORESETs are discontinuously mapped in a frequency resource region. A CORESET B 306 shows a situation where CORESETs are continuously mapped in the frequency resource region. For example, in the CORESET A 304, duration may be set to 2 symbols, CCE-REG-mappingtype may be set to interleaved, precodergranularity may be set to wideband, tci may not be set, and pdcch-DMRS-scramblingID may be set to be the same as cell ID.

Figure 4:
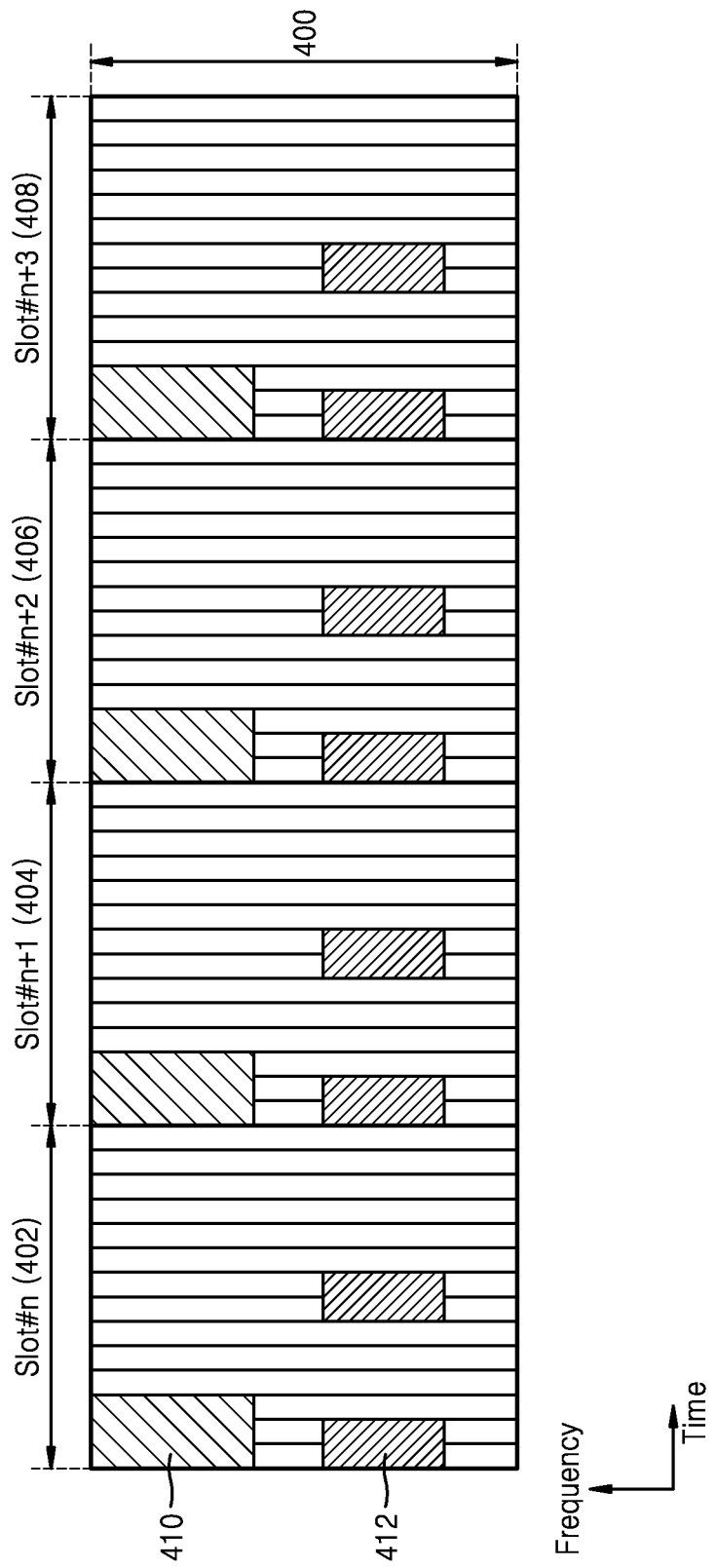
FIG. 4 illustrates a diagram for describing a process by which a user equipment (UE) configures a search space for searching for a physical downlink control channel (PDCCH) in a 5G or NR system.

FIG. 4 illustrates a diagram for describing a process by which a UE configures a search space for searching for a PDCCH in a 5G or NR system.

In the 5G or NR system, the UE may receive up to 10 pieces of search space configuration information per CORESET in one activated BWP 400. To receive the configuration of a search space, following configuration information may be set via upper layer signaling.

SearchSpaceID: ID assigned to search space configuration

ControlResourceSetID: CORESET ID associated with search space configuration

MonitoringSlotperiodicityAndOffset: information indicating CORESET configuration information of slot level unit (cycle and offset)

Duration: information indicating the number of slots where CORESETs are consecutively positioned MonitoringSymbolsWithinSlot: information indicating CORESET configuration information in symbol level unit NrofCandidates: information indicating the number of PDCCH candidates for each aggregation level configured in search space SearchSpaceType: information whether search space is UE common or UE specific and information indicating DCI format searched in search space A UE receives search space configuration information including such configuration information. Referring to FIG. 4, a search space 410 includes 3 symbol CORESETs and indicates a situation where CORESET is configured to be transmitted for each slot. In the search space 410, CORESET is configured in a first symbol in each slot. A search space 412 includes 2 symbol CORESETs and indicates a situation where CORESET is configured to be transmitted for each slot. In the search space 412, CORESET is configured in first and seventh symbols in each slot.

In the 5G or NR system, the UE is unable to search for a PDCCH candidate only with the CORESET configuration information described with reference to FIG. 3. The UE may search for the PDCCH candidate only after also receiving the search space configuration information described with reference to FIG. 4.

Figure 5:
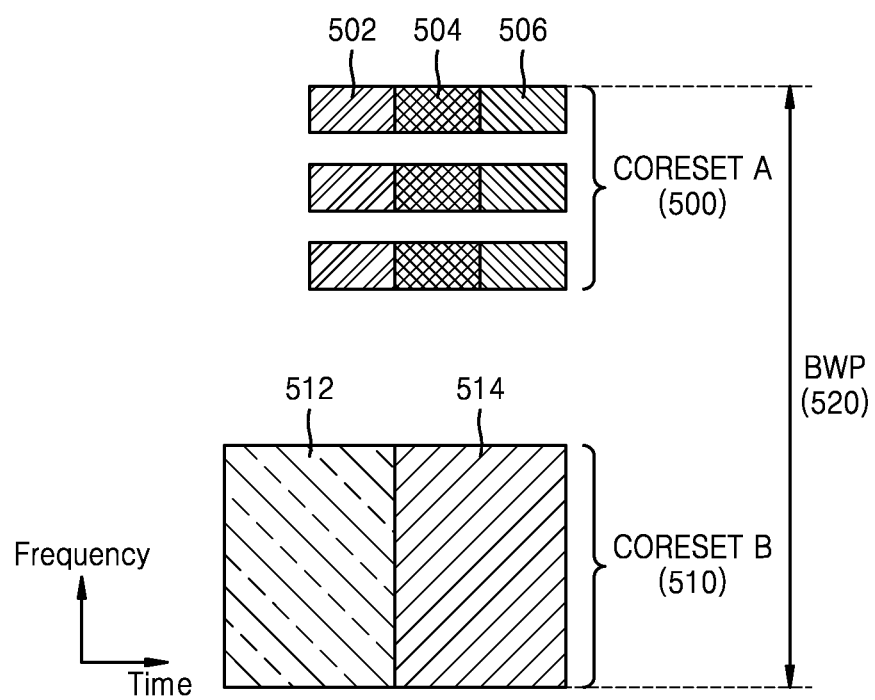
FIG. 5 illustrates a diagram for describing CORESET configuration information in a situation in which a repetition-related parameter is added to upper layer signaling configuration information, according to some embodiments of the disclosure.

FIG. 5 illustrates a diagram for describing CORESET configuration information in a situation in which a repetition-related parameter is added to upper layer signaling configuration information, according to some embodiments of the disclosure.

The purpose of the repetition-related parameter in the CORESET configuration information is to repeatedly transmit DCI by copying the CORESET configuration information to a time axis. In other words, the same DCI is repeatedly transmitted to repeatedly configured CORESETs. During PDCCH decoding, a UE may combine and decode PDCCH candidates received throughout repeatedly configured CORESETs. A base station needs to transmit the same DCI to the repeatedly configured CORESETs.

According to an embodiment of the disclosure, a parameter indicating the number of repeatedly configured CORESETs may be a repetition level. The repetition level parameter may be included in the CORESET configuration information and transmitted via upper layer signaling.

Referring to FIG. 5, CORESET A 500 and CORESET B 510 may include the repetition level parameter in the CORESET configuration information. In the CORESET A, the repetition level is 3 and in the CORESET B, the repetition level is 2. In the CORESET A, a CORESET 502 is an original CORESET or a CORESET, and CORESETs 504 and 506 are repeatedly configured CORESETs. The CORESET 502, the CORESET 504, and the CORESET 506 all share the same CORESET configuration information.

In the CORESET B, a CORESET 512 is an original CORESET or a CORESET, and CORESET 514 is repeatedly configured CORESET.

The CORESET 512 and the CORESET 514 share the same CORESET configuration information. A temporally initial CORESET may be referred to as an original CORESET, and CORESETs temporally located after the original CORESET by a repetition level may be referred to as repeated CORESETs.

For example, when the CORESET 502 includes consecutive time domain resources of a size of 2 symbols, the CORESETs 504 and 506 may also include consecutive time domain resources of a size of 2 symbols. Also, the configuration information described above with reference to FIG. 3, such as the frequency resource region except for the repetition level parameter is also equally applied. CORESET configuration information may be as follows in a situation where the repetition-related parameter is added to the upper layer signaling configuration information as in FIG. 5.

ControlResourceSetId: ID assigned to CORESET frequencyDomainResources: field indicating frequency resource region of CORESET, assigned in a bitmap manner of 6 RB units duration: field indicating time domain resource of CORESET, includes consecutive symbols cce-REG-MappingType: field indicating how CCEs including 6 REGs are mapped, includes interleaved method and non-interleaved method precodergranularity: field indicating whether same precoding is applied in narrow band unit (for example, REG bundle) or in wide band unit (for example, all RBs of BWP)

tci related parameters: field indicating QCL information pdcch-DMRS-ScramblingID: field indicating scrambling information of DMRS included in PDCCH Repetition level: number of repeated CORESETs, field indicating that same DCI may be transmitted in the same number of CORESETs as the number of repetition level Referring to FIG. 5, a situation where a value indicating a gap between repeatedly configured CORESETs, i.e., the number of symbols by which the CORESETs are spaced apart, is configured to 0 is shown. However, the gap may be any value other than 0.

According to an embodiment of the disclosure, the gap between the repeatedly configured CORESETs may be always fixed to any natural value. For example, the gap may be always fixed to 0. Also, according to an embodiment of the disclosure, the gap may be explicitly notified to the UE by being added to the upper layer signaling configuration information. For example, the base station may explicitly notify the UE of the gap by adding an offset parameter related to the gap to configuration information transmitted to the UE via higher signaling. Also, according to an embodiment of the disclosure, the gap may be implicitly configured and changed by the repetition level or the time domain resource. For example, when the repetition level is greater than 2, the UE may determine the gap to be 0, and in other cases, the UE may determine the gap to be 1. Alternatively, when a value of duration indicating the time domain resource is greater than 2, the UE may determine the gap to be 0, and in other cases, the UE may determine the gap to be 1.

According to an embodiment of the disclosure, when repetition regarding CORESET is configured according to the search space configuration information described with reference to FIG. 4, the repetition regarding CORESET may be configured according to an aggregation level (AL) included in the search space configuration information.

According to an embodiment of the disclosure, the repetition regarding CORESET may be configured according to a certain AL value. For example, when the AL value included in the search space configuration information is 4, the same DCI may be repeatedly transmitted only to PDCCH candidates of AL 4 present in each CORESET. In other words, the same DCI may not be repeatedly transmitted for other AL values. Alternatively, when the AL value included in the search space configuration information is 4, the same DCI may be repeatedly transmitted only to PDCCH candidates excluding the PDCCH candidates of AL 4 present in each CORESET, i.e., only to PDCCH candidates of AL other than AL 4. Also, for example, even when the repetition is configured for all AL values 1, 2, 4, 8, and 16 included in the search space configuration information, the AL value actually applied to PDCCH repetition may be configured only to 8 or 16. Referring to FIG. 5, the AL values 1, 2, 4, 8, and 16 are all configured for the CORESET A 502, but repetition may be configured only for PDCCH candidates of the AL value 8 and 16 for the repeated CORESETs 504 and 506. In other words, because the AL values 1, 2, and 4 are not values used for PDCCH repetition, the UE may search for a PDCCH candidate including the AL values 1, 2, and 4 with respect to only the CORESET A 502. The AL value 8 or 16 is a value used for PDCCH repetition, and it may be assumed that the UE may search for the PDCCH candidates including the AL value 8 or 16 in the CORESETs 502, 504, and 506, and the same DCI may be repeatedly transmitted to the PDCCH candidates.

According to an embodiment of the disclosure, the AL values applied to the PDCCH repetition may be applied according to the configured repetition level. For example, when the repetition level is greater than 2, the UE may determine that the PDCCH candidates of the AL values 4, 8, and 16 are repeated in the CORESETs configured as many times as the number of repetition level, and when the repetition level is smaller than 2, the UE may determine that the PDCCH candidates of the AL values 8 and 16 are repeated in the CORESETs configured as many times as the number of repetition level.

According to an embodiment of the disclosure, when repetition-based CORESET information is configured according to the search space configuration information described with reference to FIG. 4, the same DCI may be repeatedly transmitted only to PDCCH candidates having the same PDCCH candidate index in a search space hashing function with respect to each of the repeated CORESETs. Here, the same DCI may be repeatedly transmitted only to the PDCCH candidates having the same PDCCH candidate index for each AL value. For example, when PDCCH candidate indexes 1 and 2 having the AL value 8 with respect to repeated CORESETs are present for each CORESET, the same DCI may be repeatedly transmitted only to the PDCCH candidates having 1 as the index value.

According to an embodiment of the disclosure, PDCCH repetition may be applied only to first PDCCH candidates. In particular, PDCCH repetition may be applied only to the first PDCCH candidates for each AL value. Applying of PDCCH repetition means that PDCCH candidates having a particular AL value and/or PDCCH candidate index may be repeatedly transmitted with the same DCI, with respect to repeated CORESETs. Referring to FIG. 5, in CORESET 502 of CORESET A, the UE searches for PDCCH candidates having all search space index values configured for each AL, whereas in CORESETs 504 and 506, the UE may search only for PDCCH candidates having first search space index values for each AL.

According to an embodiment of the disclosure, PDCCH repetition may be applied only to first PDCCH candidates of some AL values. As described above, applying of PDCCH repetition means that PDCCH candidates having a particular AL value and/or PDCCFI candidate index may be repeatedly transmitted with the same DCI, with respect to repeated CORESETs. Accordingly, referring to FIG. 5, in CORESET 502 of CORESET A, the UE searches for PDCCH candidates having all search space index values configured for each AL, whereas in CORESETs 504 and 506, the UE may search only for PDCCH candidates having first search space index values for certain AL value.

Figure 6:
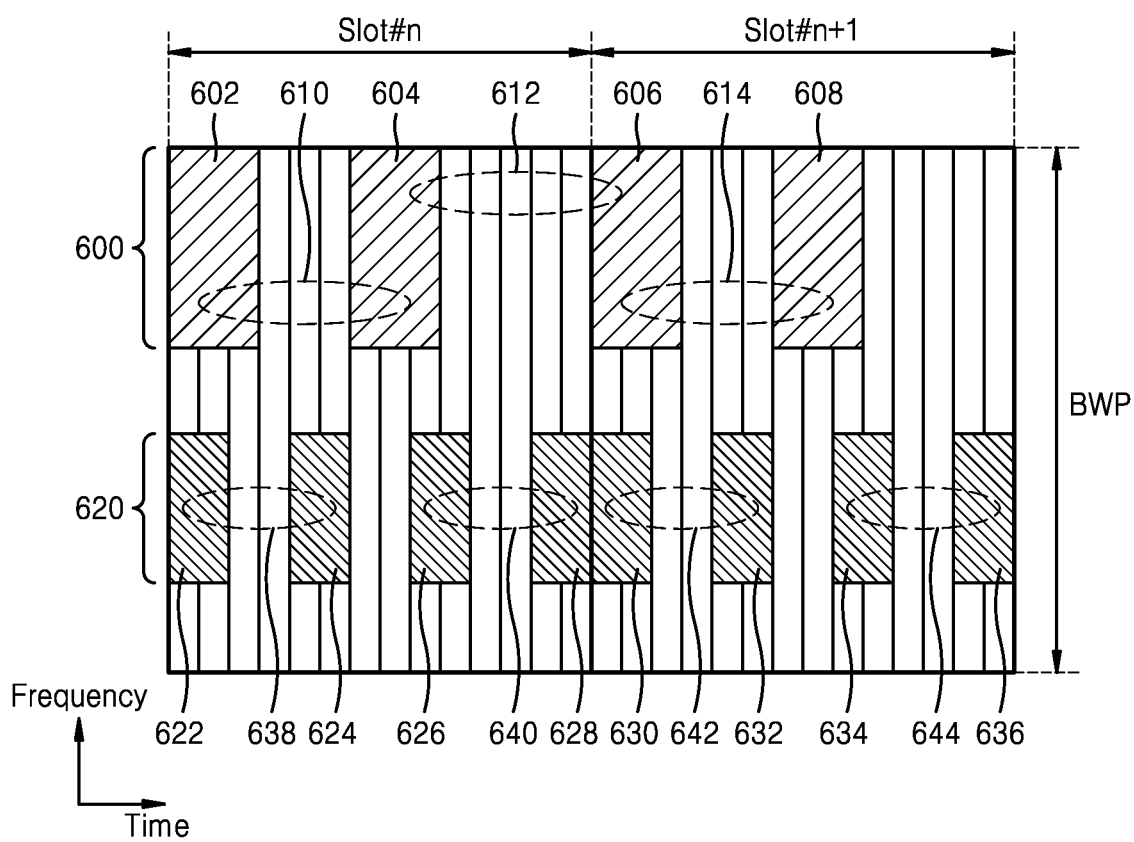
FIG. 6 illustrates a diagram for describing search space configuration in a situation in which a repetition-related parameter is added to upper layer signaling configuration information, according to some embodiments of the disclosure.

FIG. 6 illustrates a diagram for describing search space configuration in a situation in which a repetition-related parameter is added to higher signaling configuration information, according to some embodiments of the disclosure.

In search space higher signaling configuration information, repetition-related parameters may largely include a repetition level and a repetition offset value. Referring to FIG. 6, a search space 600 is connected to CORESET ID having a 3 symbol length. Also, the search space 600 illustrates an example of a situation in which a monitoringwithinslot parameter is {1,7}, and MonitoringSlotperiodicityAndOffset is 1 slot. A search space 620 is connected to CORESET ID having a 2 symbol length. Also, the search space 620 illustrates an example of a situation in which a monitoringwithinslot parameter is {1,5,9,13}, and MonitoringSlotperiodicityAndOffset is 1 slot.

The search space 600 and the search space 620 both show a situation where the repetition level is 2. However, in the search space 600, the offset is 1 and in the search space 620, the offset is 2, A CORESET 604 shows a relationship in which two CORESETs are repeated in the search space 600. Such repeating relationship may denote that PDCCH candidates configured in the two CORESETs may transmit the same DCI. Also, the offset denotes a gap between repeating reference CORESETs.

For example, because the repetition level is 2 and the offset is 1 in the search space 600, CORESET 602 and CORESET 604 may have a repetition relationship 610. Also, CORESET 604 and CORESET 606 may also have a repetition relationship 612. The repetition relationship may denote that the same DCI may be repeatedly transmitted to PDCCH candidates configured in CORESETs in the repetition relationship. As another example, because the repetition level is 2 and the offset is 2 in the search space 620, CORESET 622 and CORESET 624 may have a repetition relationship 638 and CORESET 626 and CORESET 628 may have a repetition relationship 640. Because the offset is 1 in the search space 600, one CORESET may have two repetition relationships, whereas because the offset is 2 in the search space 620, one CORESET may have one repetition relationship.

The search space configuration information may be as follows in a situation where the repetition-related parameter is added to the higher signaling configuration information, SearchSpaceID: ID assigned to search space configuration ControlResourceSetID: CORESET ID associated with search space configuration MonitoringSlotperiodicityAndOffset: information indicating CORESET configuration information of slot level unit (cycle and offset)

Duration: information indicating the number of slots where CORESETs are consecutively positioned MonitoringSymbolsWithinSlot: information indicating CORESET configuration information in symbol level unit NrofCandidates: information indicating the number of PDCCH candidates for each aggregation level configured in search space SearchSpaceType: information whether search space is UE common or UE specific and information indicating DCI format searched in search space Repetition level: number of repeated CORESETs, field indicating that same DCI may be transmitted in the same number of CORESETs as the number of repetition level Offset: gap between groups of repeated (reference) CORESETs (CORESET occasion unit)

In the disclosure, an example in which the repetition-related parameter including the offset value is included in the search space configuration information is described, but according to an embodiment of the disclosure, it may be implicitly determined that the offset value is the same as the repetition level value when only the repetition level parameter is present. In this case, one CORESET may have only one repetition relationship as in the search space 620. Regarding a more accurate operation of the situation having the above repetition relationship, the same DCI may be transmitted from the same or different PDCCH candidates, based on a search space hashing function including combinations of an AL value configured via separate higher signaling for each CORESET, the number of PDCCH candidates, and the like. The search space hashing function is shown in a following Equation.

$$L \cdot \left\{ \left( Y_{p,k_p} + \left\lfloor \frac{m_{n_{CI}} \cdot N_{CCE,p}}{L \cdot M^{(L)}_{p,max}} \right\rfloor + n_{CI} \right) \mod \lfloor N_{CCE,p}/L \rfloor \right\} + i \quad \text{Equation}$$

L denotes an aggregation level, $m_{n_{CI}}$ denotes a PDCCH candidate index, $N_{CCE,p}$ denotes the number of CCEs, $n_{CI}$ denotes a carrier index, $Y_{p,k_p}$ is always 0 in CSS and determined by C-RNTI in USS (For any CSS, $Y_{p,k_p}=0$, For USS, $Y_{p,k_p}$ is determined by C-RNTI). $M^{(L)}_{p,max}$ denotes the maximum number of PDCCH candidates, and i=0, 1, . . . , L−1.

As described above $m_{n_{CI}}$ denotes a PDCCH candidate index in a certain CORESET in Equation, and according to an embodiment of the disclosure, the same DCI may be repeatedly transmitted in repeated CORESETS having the same AL value as the PDCCH candidate index. Also, according to an embodiment of the disclosure, repetition transmission may be configured only for PDCCH candidates having a certain PDCCH candidate index or certain AL values. For example, the same DCI may be repeatedly transmitted in CORESETs having a repetition relationship with respect to PDCCH candidates of which an index value corresponds to 1. As another example, the same DCI may be repeatedly transmitted in CORESETs having a repetition relationship with respect to all PDCCH candidates of which AL value is 16, Alternatively, the same DCI may be repeatedly transmitted in a combination of the above examples, for example, CORESETs in which only certain AL and certain indexes have a repetition relationship. A configuration method for such an operation may be divided into an implicit method and an explicit method. According to an embodiment of the disclosure, the implicit method may always apply a fixed value (for example, apply only an index 1 or an AL 16) or use a group of AL values or a group of PDCCH candidate indexes limited according to a repetition level (for example, apply only AL 16 when a repetition level is 2).

Referring to FIG. 6, CORESET 604 and CORESET 606 may have the repetition relationship 612 despite that CORESET 604 and CORESET 606 are CORESETs present in different slots, according to the repetition level and offset configuration information. The repetition relationship 612 may be configured by using other methods. According to an embodiment of the disclosure, CORESETs present in different slots may be restricted from having a repetition relationship according to a repetition level value. For example, when a repetition level is 2 or less, CORESETs having a repetition relationship may be present in different slots, but when the repetition level is 2 or more, CORESETs having a repetition relationship may be fixed to be always in the same slot. In this case, even when CORESETs having a repetition relationship applied by a repetition level or offset configuration are present in different slots, the base station and the UE may determine that CORESETs do not actually have a repetition relationship. The above description is only an example and may be applied to an operation considering an opposite situation.

According to an embodiment of the disclosure, the repetition-related parameters described with reference to FIGS. 5 and 6 may operate independently or only one of the repetition-related parameters may be present. The repetition-related parameter included in the CORESET configuration information described with reference to FIG. 5 may configure a situation in which all identical CORESETs except for time resources have a gap and repeatedly mapped by a repetition level in time. The repetition-related parameter included in the search space configuration information described with reference to FIG. 6 may inform whether CORESETs have a repetition relationship or not may be notified via repetition level or offset information after slot level and mini-slot level search cycle configuration information included in the upper layer search space configuration information is configured.

According to an embodiment of the disclosure, when there is no specific restriction in a situation where CORESETs described with reference to FIGS. 5 and 6 are repeated, the UE may determine the number of PDCCH candidates for each AL, value according to upper layer search space information associated with each CORESET. For example, when the repetition level is 2 and the number of PDCCH candidates for all AL values for each COREET is 5, the total number of cases in which the same DCI may be repeatedly transmitted in terms of the UE is 25. Thus, the UE may perform blind combining and decoding for each number of cases. In terms of the UE, the number of blind decoding to be performed increases in proportion to the number of PDCCH candidates configured in the repetition level and CORESET. Thus, a condition of repeatedly transmitting the same DCI needs to be restricted under a separate condition. There may be various methods according to certain conditions for certain DCI to be present in each of repeating CORESETs.

Method 1: Only the same PDCCH Candidate Indexes Allow Repetitive Transmission of the same DCI The UE may expect that the same DCI is repeatedly transmitted only for PDCCH candidates having the same PDCCH candidate index value for each CORESET. When a certain PDCCH candidate index value is not present in at least one CORESET, the UE does not expect repetitive transmission of the same DCI for the corresponding PDCCH candidate index value. The same DCI may be repeatedly transmitted to the PDCCH candidates indicated by the corresponding PDCCH candidate index values for the remaining CORESETs except the corresponding CORESET.

Method 2: PDCCH Candidates with Certain PDCCH Candidate Index Value

The UE may expect that the same DCI is repeatedly transmitted only for PDCCH candidates having a certain PDCCH candidate index value for each CORESET. CORESET without the certain PDCCH candidate index value is not repeatedly transmitted.

Method 3: Only PDCCH Candidates with same AL Value Allow Repetitive Transmission of same DCI The UE may expect that the same DCI is repeatedly transmitted for PDCCH candidates having the same AL value for each CORESET. When there is no corresponding AL value in at least repeatable CORESET, the UE does not expect that the same DCI is repeatedly transmitted for the PDCCH candidate corresponding to the corresponding AL value. The same may be repeatedly transmitted for the remaining CORESETs except for the corresponding CORESET.

Method 4: Only PDCCH Candidates with Certain AL Value Allow Repetitive Transmission of same DCI The same DCI may be repeatedly transmitted for PDCCH candidates having the certain AL value for each CORESET. When a certain CORESET does not include a certain AL value, the same DCI may not be repeatedly transmitted for the PDCCH candidates corresponding to the certain AL value or DCI may be repeatedly transmitted only for CORESETs included in a remaining repetition group excluding the corresponding CORESET.

Method 5: Combination of Methods 1 to 4

Same DCI may be repeatedly transmitted with respect to PDCCH candidates having certain PDCCH candidate index value and/or certain AL value for each CORESET.

In the above methods, it is described that the same DCI is not repeatedly transmitted with respect to CORESET that does not satisfy the condition, and at this time, the repetition level may be extended in two methods. For example, when third CORESET with respect to total 5 CORESETs having repetition level 5 does not satisfy one of the above conditions, the UE may determine that DCI is repeatedly transmitted only to the remaining 4 CORESETs. In other words, the same DCI is repeatedly transmittable only to valid CORESETs satisfying the conditions from among CORESETs corresponding to a pre-set repetition level. As another example, example, when third CORESET with respect to total 5 CORESETs having repetition level 5 does not satisfy one of the above conditions, the UE may determine that DCI is repeatedly transmitted only to the remaining 4 CORESETs and a CORESET thereafter. In other words, the same DCI is repeatedly transmittable to CORESETs as much as a repetition level value satisfying the condition.

However, the above methods are only an embodiment of the disclosure and may be variously modified. For example, according to an embodiment of the disclosure, the same DCI may not be repeatedly transmitted to CORESET that includes at least one of a certain PDCCH candidate index or a certain AL or that does not include at least one of the certain PDCCH candidate index or the certain AL.

When the CORESET configuration information or the search space configuration information described with respect to FIG. 5 or 6 includes the repetition level parameter, an additional operation for determining validity of actually repeated CORESETs may be required. For example, the certain PDCCH candidate may be or may not be repeatedly configured at a certain moment when repeated CORESETs cross a slot boundary, a certain CORESET resource is a reserved resource, or a synchronization signal or system information is transmitted via a physical broadcast channel (PBCH). Conditions for determining validity of repeated CORESETs are as follows.

Condition 1: All repeated CORESETs are present in one slot

In other words, when two CORESETs have a repetition relationship via configuration of a repetition-related parameter, it may be determined that there is no repetition relationship when the two CORESETs are present in different slots. For example, when upper layer information indicates that 5 CORESETs have a repetition relationship and when 3 CORESETs are included in nth slot and the remaining 2 CORESETs are included in n+1th slot, the same DCI may be allowed to be repeatedly transmitted only to the 3 CORESETs included in the nth slot or the same DCI may be allowed to be repeatedly transmitted to the 3 CORESETs included in the nth slot and the same DCI may be allowed to be repeatedly transmitted to the 2 CORESETs included in the n+1th slot.

Condition 2: When a certain CORESET is unable to transmit a PDCCH candidate configured to be repeatedly transmitted, the same DCI for PDCCH candidates may be repeatedly transmitted with respect to the remaining CORESETs excluding the certain CORESET.

However, the above conditions are only an embodiment of the disclosure and may be variously modified. For example, according to an embodiment of the disclosure, when repeatedly transmitted CORESETs cross a slot boundary, whether to repeatedly transmit the same DCI may be determined by comparing a value of a repetition level parameter and a threshold value. Here, the threshold value may be a value set via upper layer signaling or set by the UE. When the value of the repetition level parameter is greater than the threshold value, the same DO may not be repeatedly transmitted to the CORESET crossing the slot boundary. Also, when the repeatedly transmitted CORESETs do not cross the slot boundary or when the value of the repetition level parameter is smaller than the threshold value even when the repeatedly transmitted CORESETs cross the slot boundary, the same DCI may be repeatedly transmitted.

Moreover, according to an embodiment of the disclosure, in the repeatedly transmitted CORESETs, it may be determined whether a CORESET overlaps a resource region with an original CORESET, a synchronization signal, or a PBCH. In the repeatedly transmitted CORESETs, when the CORESET overlaps the resource region with the original CORESET, the synchronization signal, or the PBCH, the same DCI may not be repeatedly transmitted to the overlapping CORESET.

Also, according to an embodiment of the disclosure, when only some PDCCH candidates of the repeatedly transmitted CORESETs overlap, the same DCI may not be repeatedly transmitted to the remaining PDCCH candidates that do not overlap. Here, the same DCI may be repeatedly transmitted by using a PDCCH candidate having a greater AL value next to an AL value of the overlapping PDCCH candidate. For example, when a PDCCH candidate having an AL value 16 among the repeatedly transmitted CORESETs overlaps, the same DCI may not be repeatedly transmitted to the PDCCH candidate having the AL value is 16, the same DCI may be repeatedly transmitted to the PDCCH candidates having the remaining AL values, and the same DCI may be repeatedly transmitted by using a PDCCH candidate having another AL value, for example, a PDCCH candidate having a greater AL value 8 next to 16.

Figure 7:
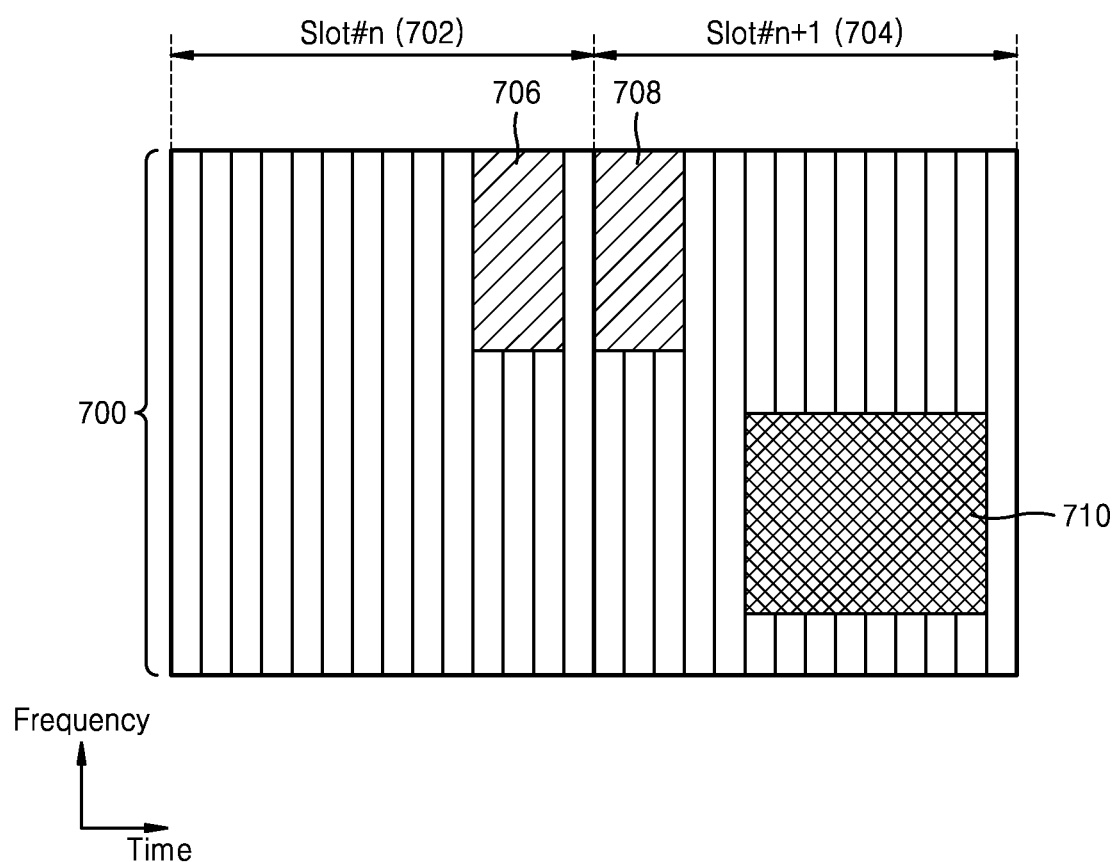
FIG. 7 illustrates a diagram for describing a data resource assigning method in a situation in which control information according to some embodiments of the disclosure is repeatedly transmitted.

FIG. 7 illustrates a diagram for describing a data resource assigning method in a situation in which control information according to some embodiments of the disclosure is repeatedly transmitted.

In FIG. 7, the same control information is repeatedly transmitted and received in two CORESETs 706 and 708. The two CORESETs 706 and 708 belong to different slots. Because the control information transmitted from the CORESET 706 of an nth slot 702 and the control information transmitted from the CORESET 708 of an n+1th slot 704 contain the same information, blind combining and decoding is possible in a UE and accordingly, decoding reliability of the control information may be increased. The control information transmitted from the CORESET 706 and the control information transmitted from the CORESET 708 indicate time and frequency resource regions to which the same PDSCH or PUSCH 710 are assigned. However, because the control information transmitted from the CORESET 706 and the control information transmitted from the CORESET 708 are located in different slots, there is a possibility that interpretation of $K_0$ for indicating time domain resources to which a data channel is assigned may vary.

For example, $K_0$ indicated by the control information transmitted from the CORESET 706 of the nth slot 702 may indicate the time domain resource of PDSCH located at an n+$K_0$th slot, and $K_0$ indicated by the control information transmitted from the CORESET 708 of the n+1th slot 704 may indicate the time domain resource of PDSCH located at an n+1+$K_0$th slot. In the above example, $K_0$ indicates a difference between a slot index where DCI scheduling PDSCH is located and a slot index where scheduled PDSCH is located.

As another example, $K_2$ indicated by the control information transmitted from the CORESET 706 of the nth slot 702 may indicate the time domain resource of PDSCH located at an n+$K_2$th slot, and $K_2$ indicated by the control information transmitted from the CORESET 708 of the n+1th slot 704 may indicate the time domain resource of PDSCH located at an n+1+$K_2$th slot. In the above example, $K_2$ indicates a difference between a slot index where DCI scheduling PUSCH is located and a slot index where scheduled PUSCH is located.

As a method for solving an issue in which the same control information described above indicates a time domain resource of a data transmission channel located in different slots, there may be following methods.

Method 1: Determine $K_0$ or $K_2$ Based on a Slot Index Belonging to the Last CORESET among a Group of CORESETs where Control Information is Repeatedly Transmittable In Method 1 according to an embodiment of the disclosure, after a CORESET group where control information is repeatedly transmittable is pre-configured via upper layer signaling, a UE may not determine that $K_0$ (or $K_2$) indicated by DCI transmitted from the CORESET group is configured based on a slot index where CORESET from which the DCI is transmitted is located, but determines that $K_0$ (or K2) is configured based on a slot index where the temporally last CORESET among the CORESET group to which the CORESET from which the DCI is transmitted belongs is located.

For example, a $K_0$ value indicated by DCI transmitted from the CORESET 706 of the nth slot in FIG. 7 may be configured based on the n+1th slot of the last CORESET 708 among the CORESET group belongs. Accordingly, $K_0$ indicated by the DCI transmitted from the CORESET 706 of the nth slot may indicate that the PDSCH or PUSCH 710 located at the n+1+$K_0$ slot is scheduled by SLIV.

Also, a $K_2$ value indicated by DCI transmitted from the CORESET 706 of the nth slot in FIG. 7 may be configured based on the n+1th slot to which the last CORESET 708 among the CORESET group belongs. Accordingly, K2 indicated by the DCI transmitted from the CORESET 706 of the nth slot may indicate that the PDSCH or PUSCH 710 located at the n+1+$K_2$ slot is scheduled by SLIV.

Also, according to another embodiment of the disclosure, when DCI transmitted in CORESET belonging to the CORESET group is not allowed to be repeatedly transmitted under a certain condition (PDCCH candidate index, AL value, or the like), $K_0$ or $K_2$ indicated by the DCI may be configured based on a slot index where the CORESET transmitting the DCI is located. However, the above examples are only an embodiment of the disclosure and may be variously modified. For example, according to an embodiment of the disclosure, the UE may determine that $K_0$ (or $K_2$) indicated by DCI transmitted from a CORESET group where control information is repeatedly transmittable is configured based on a slot index where CORESET satisfying a specific standard among the CORESET group to which the CORESET that transmitted the DCI belongs is located. For example, the specific standard may be a temporally initial CORESET or a temporally last CORESET.

Method 2: Determine SLIV (Combination of S and L) Based on Certain Symbol Index of Certain CORESET Among CORESET Group where Control Information is Repeatedly Transmittable Unlike Method 1, Method 2 according to an embodiment of the disclosure is a method of using only SLIV without using a $K_0$ (or $K_2$) value that is one of time domain resource assignment information indicated by DCI. In an existing method, an S value is set based on a first symbol of a slot indicated by $K_0$ (or $K_2$) in SLIV, but in Method 2, an S value may be set based on a certain symbol among symbols where certain CORESET is located among a CORESET group to which CORESETs where control information is repeatedly transmittable belong.

For example, the S value may be set based on the last symbol (or the last symbol+1) where the last CORESET among the CORESET group to which the CORESETs where control information is repeatedly transmittable belong is located. Referring to FIG. 7, the S value in SLIV indicated by DCI of the CORESET 706 of the nth slot may indicate that a third symbol (or the third symbol+1=a fourth symbol) where the last CORESET 708 among the CORESET group where the DCI is repeatedly transmittable is located is a start point of a symbol index for determining the S value.

The base station transmits the same control information to the UE via the CORESETs 706 and 708, and the UE may expect that the same control information may be received via the CORESETs 706 and 708. Accordingly, the base station and the UE may increase a possibility of success in transmitting and receiving control information. When the same control information capable of being repeatedly transmittable is transmitted over different slots, it may be notified that the same control information is transmitted from different slots but data resource regions scheduled by the same control information are the same via Method 1 or Method 2 described above.

Figure 8:
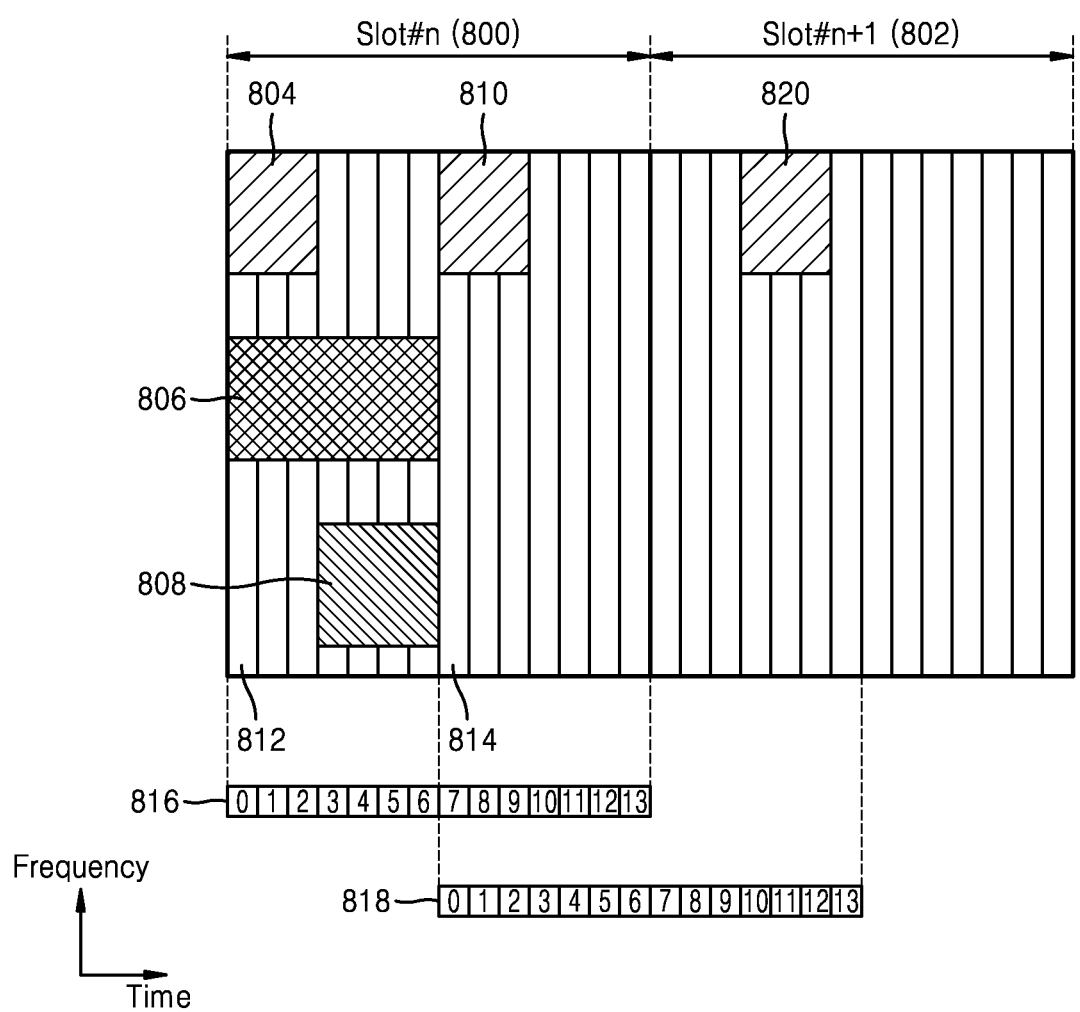
FIG. 8 illustrates a diagram for describing a data resource assigning method when a time domain resource assigning field is not included in downlink control information (DCI) according to some embodiments of the disclosure.

FIG. 8 illustrates a diagram for describing a data resource assigning method when a time domain resource assigning field is not included in DCI according to some embodiments of the disclosure.

When a base station adaptively transmits DCI to a UE to schedule PDSCH or PUSCH, a time domain resource assignment field may be or may not be included in the DCI, When the DCI includes the time domain resource assignment field, the base station may freely notify a time domain resource of PDSCH or PUSCH by a mapping time (A or B), a slot offset ($K_0$ or $K_2$), a starting symbol S, and a length L as described above with reference to FIG. 1. However, when the base station transmits the DCI to the UE without the time domain resource assignment field included in the DCI, the UE may need to determine PDSCH or PUSCH time domain resource information assigned via the DCI through another method. In this regard, following methods may be used.

Method 1: Indicate Time Domain Resource Via Upper Layer Signaling

The base station may be able to notify the UE of a time domain resource where PDSCH or PUSCH is scheduled via upper layer signaling, such as RRC or MAC CE. In other words, when the UE searches for and detects the DCI, the time domain resource of PDSCH or PUSCH scheduled in the DCI may be fixed. For example, when the base station notifies a certain UE of the time domain resource for PUSCH scheduling, such as DMRS mapping=type A, $K_2$=2, S=0, and L=7, via upper layer signaling, the UE may consider that the PUSCH scheduled by the DCI always follows DMRS mapping=type A, $K_2$=2, S=0, and L=7.

When some of PUSCH time domain resources scheduled in a TDD situation are DL, the UE may perform PUSCH transmission only for actual UL symbols. Here, a resource mapping method may perform PUSCH transmission by performing puncturing in which information mapped to a DL symbol is discarded or performing rate-matching only for the actual UL symbol. As another example, when some of the PUSCH time domain resources scheduled in the TDD situation are DL, the UE may not perform the scheduled PUSCH transmission. According to Method 1, the base station may set a possible range of a variable S to be fixed in one slot.

As another example, when a scheduled time domain resource is PDSCH and when following values may all be set via upper layer signaling and the UE always detects DCI indicating PDSCH according to Method 1, it may be determined that the PDSCH has following values.

| PDSCH mapping type | $K_0$ | S | L |
|---|---|---|---|
| PDSCH mapping type B | 0 | 0 | 7 |

As another example, when a scheduled time domain resource is PUSCH and when following values may all be set via upper layer signaling and the UE always detects DCI indicating PUSCH according to Method 1, it may be determined that the PUSCH has following values.

| PUSCH mapping type | $K_2$ | S | L |
|---|---|---|---|
| PUSCH mapping type B | 1 | 0 | 7 |

Method 2: Indicate Time Domain Resource and Reinterpret Variable S Via Upper Layer Signaling Similarly to Method 1, in Method 2, the UE may receive, from the base station, time domain resource assignment variables S, L, $K_0$, and the like of scheduled PDSCH or PUSCH via upper layer signaling.

In a method of determining an S value, symbol indexes may be determined in an order of 0, 1, 2, and so on based on a slot boundary, and the VIE may determine the S value according to the symbol index determined based on the slot boundary. In the Method 2 according to an embodiment of the disclosure, the UE does not determine the S value according to the symbol index determined based on the slot boundary, but may determine the symbol indexes in the order of 0, 1, 2, and so on based on a first symbol of CORESET including DCI scheduling the PDSCH or PUSCH, and determine the S value according to the symbol index determined based on the first symbol of CORESET including the DCI.

For example, a point where S is 0 by Method 1 in FIG. 8 corresponds to a symbol index 812 based on an nth slot 800. The corresponding S value for each symbol may be mapped according to a symbol index 816 determined based on a slot boundary, Also, when the CORESET including the DCI scheduling PDSCH or PUSCH according to Method 1 in FIG. 8 is CORESET 804, S may be mapped according to the symbol index 816 determined based on a first symbol of the CORESET 804. Also, when the CORESET including the DCI scheduling PDSCH or PUSCH according to Method 1 in FIG. 8 is CORESET 810, S may be mapped according to a symbol index 818 determined based on a first symbol of the CORESET 810.

According to Method 1 in the nth slot 800, S may be set to 7, but according to Method 2, s may be set to 0. According to Method 1, the variable S may be set to be always present in one slot, but according to Method 2, the variable S may be present over two continuous slots as in FIG. 8. According to Method 2, a possible value of the variable S may be maximized in a situation where the DCI scheduling the PDSCH is unlikely to be transmitted at a later timing than the corresponding PDSCH.

In Method 2, a reference symbol used to determine the symbol index for determining the variable S is limited to a first symbol of CORESET, but either of a last symbol of CORESET and any symbol of CORESET other than the first symbol of CORESET may be the reference symbol of determining the symbol index for determining the variable S. When CORESET is present over 3 symbols and the variable S is determinable according to a symbol index based on a certain symbol among the 3 symbols, it may be notified, via upper layer signaling, that the certain symbols of CORESET is a reference value of determining the symbol index for determining the variable S. As another example, when a scheduled time domain resource is PDSCH and when following values may all be set via upper layer signaling and the UE always detects DCI indicating PDSCH according to Method it may be determined that the PDSCH has following values.

| PDSCH mapping type | $K_0$ | S | L |
|---|---|---|---|
| PDSCH mapping type B | 0 | 0 | 7 |

As another example, when a scheduled time domain resource is PUSCH and when following values may all be set via upper layer signaling and the LE always detects DCI indicating PUSCH according to Method 2, it is determined that the PUSCH has following values,

| PUSCH mapping type | $K_2$ | S | L |
| --- | --- | --- | --- |
| PUSCH mapping type B | 1 | 0 | 7 |

Unlike Method 1, in Method 2, a start symbol (0) of a symbol index for determining the S value is not based on a symbol adjacent to a slot boundary, but is based on a first symbol of CORESET including DCI scheduling PDSCH or PUSCH or based on a symbol corresponding to a last symbol+1 of CORESET.

Method 3: Implicitly Configure Time Domain Resource Via CORESET Configuration Value According to an embodiment of the disclosure, the UE may determine PDSCH or PUSCH time domain resource scheduled to the UE, based on a CORESET configuration value without separate upper layer signaling of indicating time domain resource configuration.

According to an embodiment of the disclosure, in FDD, a time domain resource to which PDSCH or PUSCH is scheduled may be configured based on a time domain resource of CORESET including DCI scheduling PDSCH or PUSCH.

For example, an S value of PDSCH may be a first symbol of the time domain resource of CORESET including the DCI scheduling the PDSCH or a symbol corresponding to a last symbol+1 of the time domain resource of CORESET. Also, an S value of PUSCH may be a first symbol of the time domain resource of CORESET including the DCI scheduling the PUSCH or a symbol corresponding to a last symbol+1 of the time domain resource of CORESET. Also, an S value of PUSCH may be a first symbol of the time domain resource of CORESET including the DCI scheduling the PUSCH or a symbol corresponding to a last symbol+ [minimum processing time] of the time domain resource of CORESET. Here, the minimum processing time may denote a preparation time of the UE required before the UE receives UL grant for scheduling PUSCH and then transmits PUSCH. The minimum processing time may have different values based on subcarrier spacing or PUCCH & PUSCH multiplexing.

In TDD according to an embodiment of the disclosure, a time domain resource where PDSCH or PUSCH is scheduled may be configured based on a time domain resource of CORESET including the DCI scheduling PDSCH or PUSCH and whether a symbol having the same transmission direction as PDSCH or PUSCH is present. For example, when data scheduled by DCI is PDSCH, the S value may correspond to the first symbol or the last symbol+1 of CORESET including DCI scheduling the PDSCH or to a first DL symbol present after CORESET. Also, when the data scheduled by DCI is PUSCH, the S value may correspond to a first UL symbol satisfying a UE processing time. The UE processing time may denote a time consumed for the UE to receive UL grant and transmit PUSCH, and may vary based on capability of the UE or subcarrier spacing. An L value may be determined by a time difference in the time domain resource of two consecutive CORESETs. For example, the L value may be set according to Equation below.

$$L=\{\text{first symbol index of next CORESET}\}-S \quad \text{Equation}$$

In particular, the UE may determine that the L value is set up to a symbol corresponding to a first symbol-1 of the time domain resource including a temporally first CORESET among CORESETs after the CORESET including the DCI scheduling PDSCH or PUSCH.

For example, when PDSCH 806 is scheduled by CORESET 804 while CORESET 804 and CORESET 810 are present as shown in FIG. 8, the UE may determine that a first symbol of CORESET 804 including DCI indicating PDSCH 806 corresponds to the S value and the length up to a symbol corresponding to a first symbol-1 of CORESET 810 present immediately after CORESET 804 is the L value. In this case, the L value is 7. Here, the L value may be the length from the first symbol of first CORESET 804 to the symbol corresponding to the first symbol-1 of second CORESET 810. The LE may determine that PDSCH is assigned to a time domain resource from the first symbol to $7^{th}$ symbol of CORESET 804 including Also, when PDSCH 808 is scheduled by CORESET 804 in FIG. 8, the UE may determine that a symbol corresponding to a last symbol+1 of CORESET 804 including DCI indicating PDSCH 808 corresponds to the S value and the length up to a symbol corresponding to a first symbol-1 of CORESET 810 present immediately after CORESET 804 is the L value. In this case, the L value is 4. Here, the L value may be the length from the symbol corresponding to the last symbol+1 of first CORESET 804 to a symbol corresponding to the first symbol-1 of second CORESET 810. The may determine that is assigned to a time domain resource including 4 symbols starting from the last symbol+1 of CORESET 804 including DCI.

In Method 3 according to an embodiment of the disclosure, the UE may determine that 0 is applied to $K_0$ and PDSCH mapping type B is applied with respect to time domain resource assignment.

The definition of CORESET considered in Method 3 may denote only CORESETs having the same CORESET ID or may denote not only CORESETs having the same CORESET ID but also CORESETs having different CORESET IDs. When the definition of CORESET denotes only CORESETs having the same CORSET ID, the UE may determine the L value while considering a difference with CORESET having the same CORESET ID and being present first after CORESET including DCI scheduling PDSCH or PUSCH. When the definition of CORESET denotes not only CORESETs having the same CORESET ID but also CORESETs having different CORESET IDs, the UE may determine the L value while considering a difference with CORESET that is present first after CORESET including DCI scheduling PDSCH or PUSCH regardless of whether CORESET ID is the same there as.

When Method 3 is applied and two consecutive CORESETs are present in different slots, there may be following two methods as a method for determining time domain resource assignment.

Method 3-1: Prioritize Slot Boundary

According to an embodiment of the disclosure, when CORESET present first after CORESET including DCI scheduling PUSCH or PDSCH is present in a different slot, an L value may be calculated by applying following Equation.

$$L=\{\text{last symbol index of the slot that } S \text{ apply}\}-S \quad \text{Equation}$$

For example, when a S value is 7 in CORESET 810 of FIG. 8, the L value of scheduled PDSCH is 7.

Method 3-2: Ignore Slot Boundary

According to an embodiment of the disclosure, when CORESET (next CORESET) present first after CORESET including DCI scheduling PUSCH or PDSCH is present in a different slot, an L value may be calculated by applying following Equation.

$L=\{$first symbol index of next CORESET$-1\}+$slot length$*$slot gap$-S$  Equation For example, when a S value is 7 in CORESET 810 of FIG. 8, the L value of scheduled PDSCH is 10.

In a slot length in above Equation, a normal cyclic prefix corresponds to14 and an extended cyclic prefix corresponds to 12. A slot gap in above Equation denotes a difference between a slot including CORESET including DCI scheduling PUSCH or PDSCH and a slot including CORESET present first after CORESET including DCI scheduling PUSCH or PDSCH.

Figure 9:
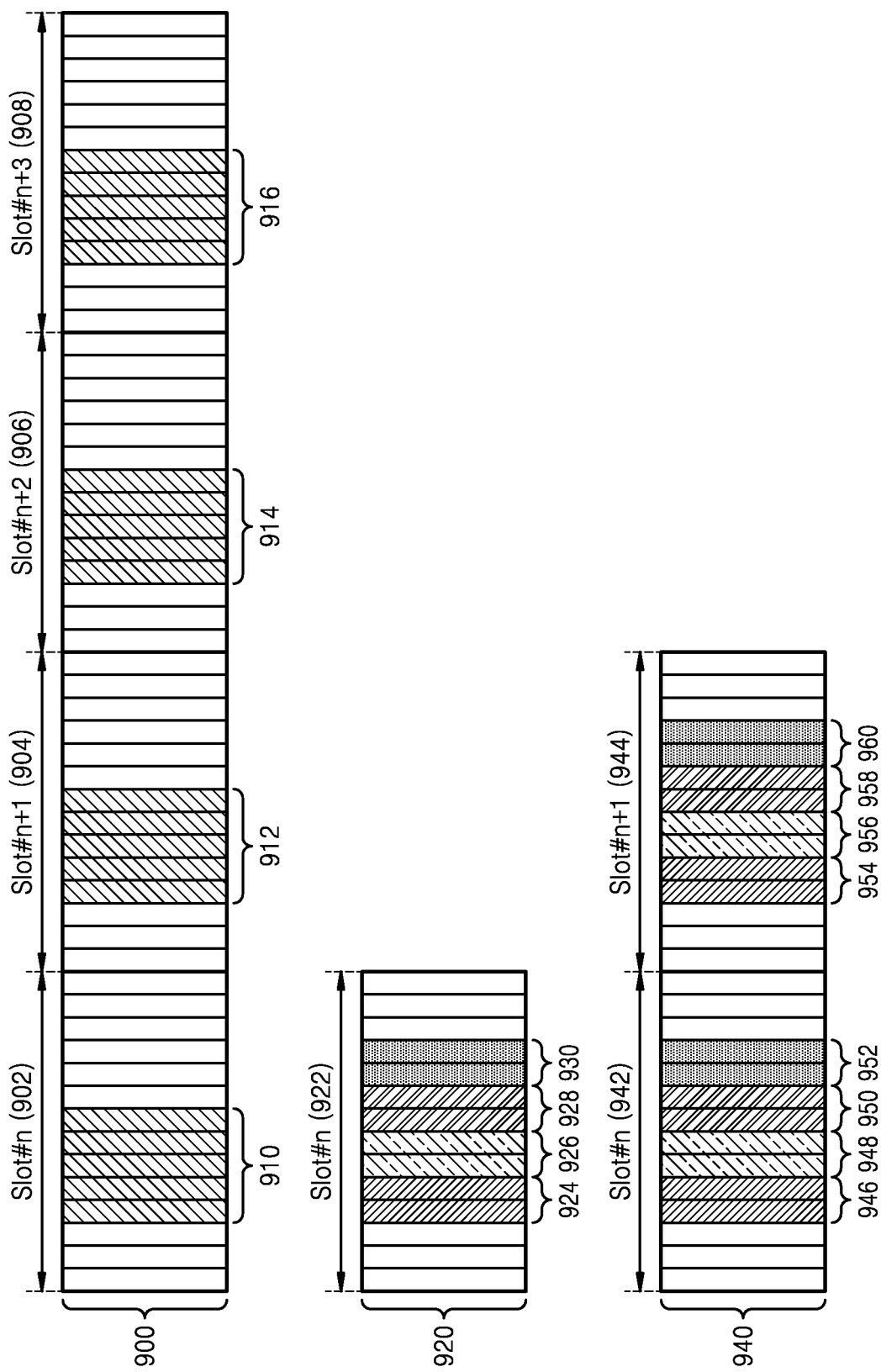
FIG. 9 illustrates a diagram for describing a data resource assigning method in a situation in which data repetitive transmission according to some embodiments of the disclosure is possible.

FIG. 9 illustrates a diagram for describing a data resource assigning method in a situation in which data repetitive transmission according to some embodiments of the disclosure is possible.

A UE receives 1 or greater as an aggregationFactorDL value via upper layer signaling, the same symbol assignment (i.e., PDSCH) is applied over continuous as many times as the number of configured aggregationFactorDL. The UE may expect one TB to be repeated within the same symbol assignment in each slot of the continuous slots as many times as the number of aggregationFactorDL.

A UE receives 1 or greater as an aggregationFactorUL value via upper layer signaling, the same symbol assignment (i.e., PUSCH) is applied over continuous slots as many times as the number of configured aggregationFactorUL. The UE may expect one TB to be repeated within the same symbol assignment in each slot of the continuous slots as many times as the number of aggregationFactorUL.

aggregationFactorDL or aggregationFactorUL is a upper layer signaling parameter capable of supporting repetitive transmission of a slot level. For example, in a case 900 in FIG. 9, aggregationFactorDL (or aggregationFactorUL) is 4, and the UE may determine that PDSCH (or PUSCH) scheduled via DCI has the same symbol assignments 910, 912, 914, and 916 for 4 consecutive slots 902, 904, 906, and 908 and receive PDSCH (or transmit PUSCH) in a corresponding time domain resource. In other words, the UE may determine that PDSCH (or PUSCH) of 5 symbol length is assigned to 4 consecutive slots.

The above method is a data repetitive transmitting method of a slot unit, and a data repetitive transmitting method of a non-slot (or mini-slot) unit will be described with reference to a reference numeral 920 of FIG. 9.

When the UE receives a value greater than 1 as a SymbolaggregationFactorDL value via upper layer signaling, the LE may determine that time domain resources of PDSCH scheduled via DCI are continuously and repeatedly mapped as much as the number of SymbolaggregationFactorDL in a slot. In other words, the UE may expect that TB is repeatedly transmitted from the base station to the UE in one slot, as much as the number of Symbol aggregationFactorDL. Here, SymbolaggregationFactorDL received via upper layer signaling may denote the number of times PDSCH scheduled via DCI is repeatedly assigned in one slot.

When the UE receives a value greater than 1 as a SymbolaggregationFactorUL value via upper layer signaling, the UE may determine that time domain resources of PUSCH scheduled via DCI are continuously and repeatedly mapped as much as the number of SymbolaggregationFactorUL in a slot. In other words, the UE may expect that TB is repeatedly transmitted from the base station to the UE in one slot, as much as the number of SymbolaggregationFactorUL. Here, SymbolaggregationFactorUL received via upper layer signaling may denote the number of times PUSCH scheduled via DCI is repeatedly assigned in one slot.

For example, in FIG. 9, when the UE receives 4 as theSymbolaggregationFactorDL value and scheduled with PDSCH 924 of 2 symbol length from the base station, the UE may determine that 2 symbols are repeated four times continuously in a slot 922. In other words, PDSCH may be actually assigned over reference numerals 924, 926, 928, and 930. Also, TB included in PDSCH may be repeatedly transmitted four times over the reference numerals 924, 926, 928, and 930.

According to an embodiment of the disclosure, when PDSCH assignment crosses a slot boundary due to the SymbolaggregationFactorDL value configured via upper layer signaling and a size of scheduled PDSCH time domain resources, the UE may determine that PDSCH is not assigned with respect to PDSCH crossing the slot boundary.

Also, according to an embodiment of the disclosure, the UE may assume that the PDSCH time domain resources that may be scheduled according to the Symbol aggregationFactorDL value is limited. The PDSCH time domain resources may include an S value and an L value. For example, when the SymbolaggregationFactorDL value is 4, the UE may not be scheduled with PDSCH having the S value of 8 and the L value of 3 symbol length.

A combination of S and L may be limited according to SymbolaggregationFactorDL based on following Equation.

$S=14-(L\times\text{SymbolaggregationFactorDL})-1$  Equation

Also, according to an embodiment of the disclosure, when PDSCH scheduled via SymbolaggregationFactorDL is repeatedly mapped and when at least a portion of at least one symbol is pre-assigned as a UL symbol or mapped to another slot in each mapped time domain resource, the UE may not expect data to be transmitted to the mapped resource.

For example, when SymbolaggregationFactorDL is 3 and PDSCH of 3 symbol length is scheduled, the UE may expect PDSCH of total 9 symbol (3×3 symbols) length to be repeatedly transmitted. Here, when 3 symbols are a repetitive symbol group, total 3 repetitive symbol groups are present. Here, when at least one symbol is pre-assigned to UL or is present in another slot in a certain repetitive symbol group, the UE may expect PDSCH to be not transmitted to the certain repetitive symbol group. In other words, TB may not be transmitted in the repetitive symbol group. An example about the data repetitive transmitting method of a non-slot (or mini-slot) unit described above is based on DL data transmission, but the above description may be sufficiently applied to UL data transmission. In other words, the above example may be sufficiently interpreted as an UL data transmission example by changing the terms from SymbolaggregationFactorDL to SymbolaggregationFactorUL, from PDSCH to PUSCH, and from UL to DL.

When SymbolaggregationFactorDL (or SymbolaggregationFactorUL) and aggregationFactorDL (or aggregationFactorUL) are each configured via upper layer signaling (or both are set to a value greater than 1), there is a need to define operations of the UE. This is because the upper layer signaling parameter SymbolaggregationFactorDL (or SymabolaggregationFactorUL) supporting repetitive transmission of a symbol group unit and the upper layer signaling parameter aggregationFactorDL (or aggregationFactorUL) supporting repetitive transmission of a slot unit may be used for different purposes.

For example, when the repetitive transmission of a symbol group is supported according to SymbolaggregationFactorDL (or SymbolaggregationFactorUL), beamforming-based transmission or fast decoding of the UE may be performed, and when the repetitive transmission of a slot unit is supported according to aggregationFactorDL (or aggregationFactorUL), transmission of wider coverage may be supported. Accordingly, the UE supporting URLLC data transmission may need to reduce a delay time by supporting the repetitive transmission in a symbol group unit according to SymbolaggregationFactorDL (or SymabolaggregationFactorUL). Also, the UE supporting eMBB data may need to support the repetitive transmission of a slot unit according to aggregationFactorDL (or aggregationFactorUL) to support the transmission of wider coverage, thereby supporting high-speed transmission of high capacity data. When the UE supports both URLLC data transmission and eMBB data transmission, the two types of upper layer signaling parameters may be simultaneously applied to support the repetitive transmission of both symbol group unit and slot unit.

The base station may configure, as a upper layer signaling parameter, at least one of the two types of upper layer signaling parameters (aggregationFactorDL, aggregationFactorUL, SymbolaggregationFactorDL, and SymbolaggregationFactorUL) described above while considering whether the UE supports a URLLC data transmission service or an eMBB data transmission service, and transmit a corresponding value to the UE.

According to an embodiment of the disclosure, when only one type of the two types of upper layer signaling parameters is configured as the upper layer signaling parameter and transmitted to the UE, the UE may determine time domain assignment of PDSCH (or PUSCH) by applying the received one type of upper layer signaling parameter on the scheduled PDSCH (or PUSCH).

When the two types of upper layer signaling parameters are simultaneously configured and transmitted to the UE via upper layer signaling, operations of the UE regarding how to apply the two types of upper layer signaling parameters on the scheduled PDSCH (or PUSCH) need to be specified. The operations of the UE when the two types of upper layer signaling parameters are simultaneously configured and transmitted to the UE via upper layer signaling may be supported according to following methods according to an embodiment of the disclosure. Hereinafter, for convenience of description, DL data transmission is assumed.

Method 1: Determine that aggregationFactorDL and SymbolaggregationFactorDL are Simultaneously Applied.

In Method 1 according to an embodiment of the disclosure, the UE may assign PDSCH of a symbol group unit by first applying a SymbolaggregationFactorDL value to a time domain resource of PDSCH scheduled via DCI and then determine that the PDSCH assigned in a symbol group unit assigned in a slot is assigned as much as slots of the number of continuous aggregationFactorDL.

For example, in FIG. 9, when the UE is configured with SymbolaggregationFactorDL=4 and aggregationFactorDL=2 in a situation where PDSCH 946 with S=4 and L=2 is scheduled at an nth slot 942, the UE may determine that PDSCH 946, 948, 950, and 952 are consecutively and repeatedly mapped total four times to a symbol group having two symbol length in which S starts from 2, according to SymbolaggregationFactorDL=4. Then, the four mapped symbol groups 946, 948, 950, and 952 may be repeatedly transmitted over two consecutive slots (946, 948, 950, and 952 in the nth slot and 954, 956, 958, and 960 in an n+1th slot).

According to an embodiment of the disclosure, when the UE supports both the URLLC data transmission service and the eMBB data transmission service, the time domain resource assignment of PDSCH may be determined by applying aggregationFactorDL and SymbolaggregationFactorDL simultaneously according to Method 1.

Method 2: Determine that only SymbolaggregationFactorDL is Applied

In Method 2 according to an embodiment of the disclosure, when the upper layer signaling parameters SymbolaggregationFactorDL and aggregationFactorDL are both configured to a value greater than 1, the UE may determine that PDSCH is mapped (or the time domain resource is assigned) by applying only the upper layer signaling parameter SymbolaggregationFactorDL. In other words, the UE may ignore the configuration information of the upper layer signaling parameter aggregationFactorDL.

According to an embodiment of the disclosure, when the UE does not support the eMBB data transmission service and supports the URLLC data transmission service, time domain resource assignment of PDSCH may be determined by applying only SymbolaggregationFactorDL among the upper layer signaling parameters SymbolaggregationFactorDL and aggregationFactorDL, according to Method 2.

Method 3: Apply One of SymbolaggregationFactorDL and aggregationFactorDL Adaptively According to PDSCH Mapping Type In Method 3 according to an embodiment of the disclosure, the UE may determine whether PDSCH follows SymbolaggregationFactorDL configuration or aggregationFactorDL configuration according to a value indicating a PDSCH mapping type among time domain resource information in DCI.

For example, when the PDSCH mapping type is A, the UE may apply aggregationFactorDL configuration by determining that the scheduled PDSCH follows the aggregationFactorDL configuration. For example, when the PDSCH mapping type is B, the UE may apply SymbolaggregationFactorDL configuration by determining that the scheduled PDSCH follows the SymbolaggregationFactorDL configuration.

Method 4: Apply One of SymbolaggregationFactorDL and aggregationFactorDL Adaptively According to SymbolaggregationFactorDL and Time Domain Resource Information of Scheduled PDSCH In Method 4 according to an embodiment of the disclosure, SymbolaggregationFactorDL configuration information may be first applied to PDSCH based on time domain resource information in DCI and when a resource region where PDSCH to which the SymbolaggregationFactorDL configuration information is applied is repeatedly assigned crosses a slot boundary, the UE may determine that only aggregationFactorDL configuration is applied to scheduled PDSCH.

Also, when SymbolaggregationFactorDL configuration information is first applied based on the time domain resource information in DCI and the resource region where the applied PDSCH is repeatedly assigned does not cross the slot boundary, the UE may determine that only SymbolaggregationFactorDL configuration is applied to scheduled PDSCH.

Method 5: Apply One of SymbolaggregationFactorDL and aggregationFactorDL Adaptively According to a Search Space Type where DCI Scheduling PDSCH is Transmitted In Method 5 according to an embodiment of the disclosure, the UE may determine that aggregationfactorDL is applied to PDSCH scheduled by DCI transmitted from a common search space. The UE may determine that SymboaggregationFactorDL is applied to PDSCH scheduled by DCI transmitted from a UE-specific search space.

Method 6: Apply One of SymbolaggregationFactorDL and aggregationFactorDL Adaptively According to RNTI In Method 6 according to an embodiment of the disclosure, the UE may determine that aggregationFactorDL is applied to PDSCH scheduled by DCI scrambled via C-RNTI. The UE may determine that SymbolaggregationFactorDL is applied to PDSCH scheduled by MSC-C-RNTI (or URLLC-C-RNTI).

In the above examples and descriptions, DL data transmission is considered, but UL data transmission may be sufficiently applied by changing terms from SymbolaggregationFactorDL, aggregationFactorDL, and PDSCH to SymbolaggregationFactorUL, aggregationFactorUL, and PUSCH.

Figure 10:
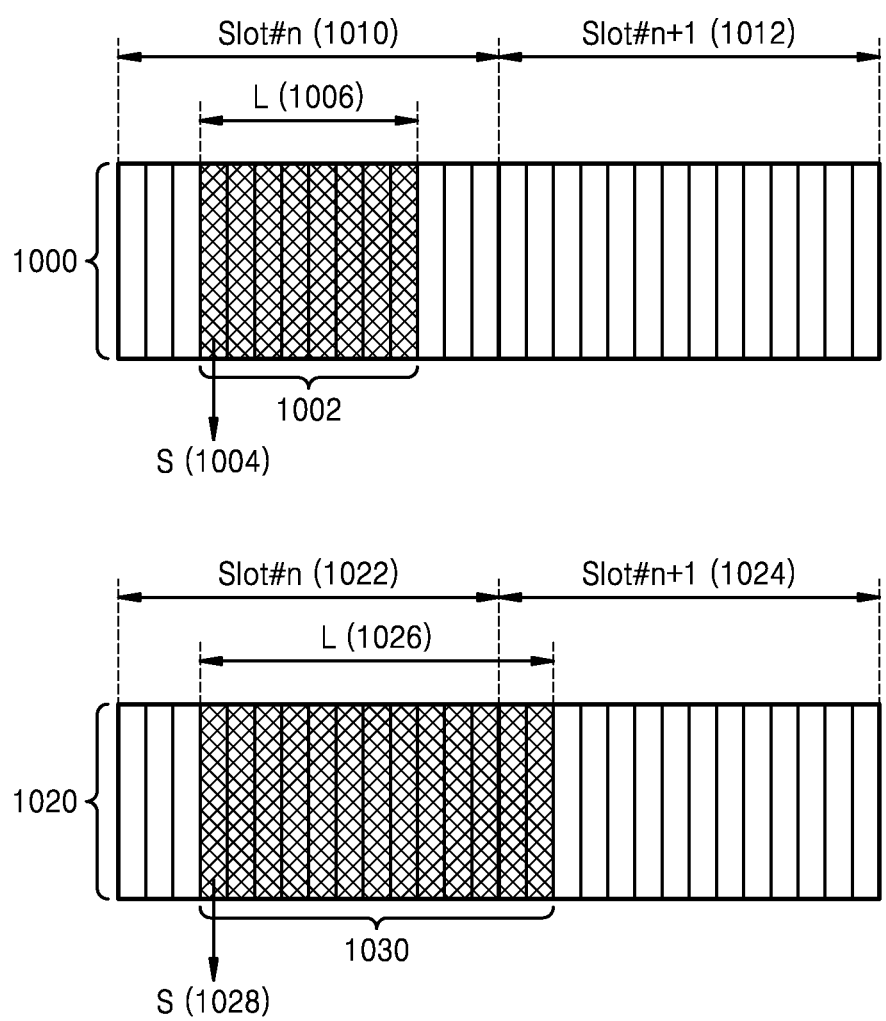
FIG. 10 illustrates a diagram for describing a data resource assigning method considering a slot boundary according to some embodiments of the disclosure.

FIG. 10 illustrates a diagram for describing a data resource assigning method considering a slot boundary according to some embodiments of the disclosure.

The UE may receive time domain resource assignment for PDSCH or PUSCH via SLIV. Here, there may be following two methods as a method of configuring an S value of SLIV.

Method 1: Set Start Symbol S Based on Start Symbol of Slot

In Method 1 according to an embodiment of the disclosure, time domain resource assignment of PDSCH or PUSCH is limited to a slot and a possible combination of S and L may be limited according to following Equation. Here, a slot to which time domain resource of PDSCH or PUSCH is assigned may be a slot determined that PDSCH or PUSCH is assigned based on $K_0$ or $K_2$ included in DCI scheduling PDSCH or PUSCH.

If $(L-1) \leq 7$ then $$SLIV = 14 \cdot (L-1) + S$$

else $$SLIV = 14 \cdot (14-L+1) + (14-1-S)$$

where $0 < L \leq 14-S$            Equation

For example, in a case 1000 of FIG. 10, the UE receives S 1004 as a fourth symbol based on a start symbol of a slot in an nth slot 1010, and is scheduled with PDSCH or PUSCH 1002 in which L 1006 has an 8 symbol length.

Method 2: Start Symbol S is Configured Based on First Symbol of CORESET Including DCI Scheduling PDSCH or PUSCH.

In Method 2 according to an embodiment of the disclosure, an S value of SLIV for time domain resource assignment of PDSCH or PUSCH may be configured based on a first symbol of CORESET including DCI scheduling PDSCH or PUSCH.

For example, in a case 1020 of FIG. 10, when a first symbol of CORESET including DCI scheduling PDSCH 1030 corresponds to a fourth symbol based on a start symbol of an nth slot 1022, S 1028 is 0 based on the first symbol of CORESET including DCI and L 1026 is scheduled with PDSCH 1030 having a 13 symbol length. Here, PDSCH 1030 is assigned to both the nth slot 1022 and an n+1th slot 1024 by the S and L values.

Method 2 is a method allowing the time domain resource assignment of PDSCH or PUSCH to cross a slot boundary. According to Method 2, resource assignment may be further facilitated for a service requiring low latency and high reliability such as URLLC, and disadvantages of Method 1 limiting time domain resource assignment of PDSCH or PUSCH within a slot may be compensated for.

Also, when CORESET including DCI scheduling PDSCH or PUSCH is present later in time, large complexity is required in terms of UE implementation, and thus PDSCH or PUSCH may be present at the same time or later than CORESET in general. Accordingly, the S value may be based on CORESET.

The UE may receive the S value based on the start symbol of the slot according to Method 1 or based on a first symbol of CORESET including DCI scheduling PDSCH or PUSCH according to Method 2, based on a UE type. Here, the UE type may include a UE supporting only Method 1, a UE supporting only Method 2, and a UE supporting both Method 1 and Method 2.

According to an embodiment of the disclosure, when the UE supports both Method 1 and Method 2, the UE may receive information about which one of Method 1 and Method 2 is applied to configure the S value in SLIV within DCI via upper layer signaling and determine which one of Method 1 and Method 2 is applied to configure the S value in SIV in DCI.

Also, according to an embodiment of the disclosure, when the UE supports both Method 1 and Method 2, the UE may receive information about which one of Method 1 and Method 2 is applied to configure the S value in SLIV within DCI via L1 signaling and determine which one of Method 1 and Method 2 is applied to configure the S value in SIV in DCI.

Also, according to an embodiment of the disclosure, when the UE supports both Method 1 and Method 2, the UE may implicitly determine that the S value in SLIV configured in a common search space is configured by applying Method 1 and the S value in SLIV configured in a UE-specific search space is configured by applying Method 2.

Also, according to an embodiment of the disclosure, when the UE supports both Method 1 and Method 2, the UE may implicitly determine that the S value in SLIV indicated by DCI scrambled via C-RNTI is configured by applying Method 1 and the S value in SLIV indicated by DCI scrambled via URLLC-C-RNTI (or MCS-C-RNTI) is configured by applying Method 2.

Also, according to an embodiment of the disclosure, when the UE supports both Method 1 and Method 2, the UE may implicitly determine which one of Method 1 and Method 2 is applied to configure the S value in SLIV indicated by DCI according to a PDSCH mapping type (or PUSCH mapping type).

For example, when the PDSCH mapping type (or PUSCH mapping type) is A, the UE may determine that the A value in SLIV indicated by DCI is configured by applying Method 1. Also, when the PDSCH mapping type (or PUSCH mapping type) is B, the UE may determine that the A value in SLIV indicated by DCI is configured by applying Method 2.

Figure 11:
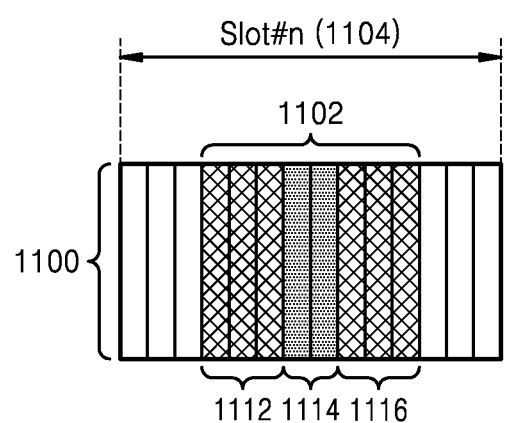
FIG. 11 illustrates a diagram for describing a method of assigning discontinuous data resources, according to some embodiments of the disclosure.
Figure 11:
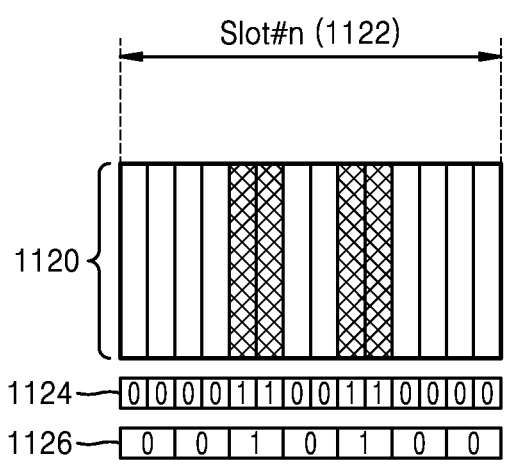

FIG. 11 illustrates a diagram for describing a method of assigning discontinuous data resources, according to some embodiments of the disclosure.

In TDD where a DL symbol and an UL symbol coexist in the same frequency band, PDSCH or PUSCH time domain resource assignment may be limited. For example, the UE may require two pieces of DCI due to an UL symbol section 1114 configured in the middle so as to receive PDSCH in a section 1102 of an nth slot 1104. This is because PDSCH scheduled by one piece of DCI is capable of being assigned only with consecutive data resources. Accordingly, one piece of DCI schedules PDSCH 1112 and one piece of DCI schedules PDSCH 1116.

In terms of data transmission, PDSCH 1112 and PDSCH 1116 include different TBs. To transmit two pieces of DCI, two PDCCH candidates are required, and in case of a service requiting high reliability such as URLLC, PDCCH candidate resources (or a large number of CCEs) may be required to increase reliability of DCI transmission. Thus, a discontinuous data resource assigning method is required to transmit data while efficiently using control information in a TDD structure. In this regard, following discontinuous data resource assigning methods may be used.

Method 1: Redefine UE Operation

In Method 1 according to an embodiment of the disclosure, when some symbols among scheduled time domain resources have a transmission direction (UL or DL) different from scheduled information, the UE may expect to receive or transmit data in the remaining time domain resources excluding the some symbols among the scheduled time domain resources.

For example, in FIG. 11, when the UE is aware that the section 1114 is UL via upper layer signaling or L1 signaling received before DCI scheduling PDSCH while being scheduled with PDSCH having SLIV corresponding to the section 1102, the UE may determine that PDSCH is actually mapped to sections 1112 and 1116. In other words, the UE may determine that TB included in PDSCH is mapped over the sections 1112 and 1116. Accordingly, the UE may be able to receive PDSCH in the sections 1112 and 1116 even when one piece of DCI is received.

In the above example, a portion of the time domain resources scheduled when PDSCH is scheduled indicates UL, but the above example is sufficiently applicable to a situation where a portion of the time domain resources scheduled when PUSCH is scheduled indicates DL.

Method 2: Bitmap-Based Time Domain Resource Assignment

Unlike a general method in which a base station notifies a UE of time domain resources to which PDSCH or PUSCH is assigned via a start symbol and a symbol length via SLIV Method 2 according to an embodiment of the disclosure is a method of notifying whether actual PDSCH or PUSCH is assigned to each symbol (or symbol group) within one slot in a bitmap manner.

For example, in FIG. 11, the UE may notify whether PDSCH is assigned for each symbol via a time domain resource assignment bitmap 1124 having 14 bits. When 1 denotes PDSCH assignment and 0 denotes PDSCH unassignment, PDSCH is assigned only to symbols corresponding to a bit set to 1. Alternatively, in FIG. 11, the UE may notify whether PDSCH is assigned for each symbol group (including 2 symbols) via a time domain resource assignment bitmap 1126 having 7 bits.

According to an embodiment of the disclosure, time domain sections indicated by each bit may have the same size or may have sizes different by one or two symbols. Also, the time domain sections indicated by each bit may be determined via a relationship of a time domain length T (the number of symbols in a slot) and the number of bits n (the size of a time domain resource assignment bitmap field in DCI) of time domain resource assignment information based on one carrier. In other words, 1 bit configuring time domain resource assignment information may indicate PDSCH assignment information regarding $\lceil T/n \rceil$ consecutive symbols or PDSCH assignment information regarding $\lfloor T/n \rfloor$ consecutive symbols.

In particular, n bit fields may have an one-to-one mapping relationship with n consecutive symbol groups. In n consecutive symbol groups, first $T-\lfloor T/n \rfloor*n$ symbol groups may include $\lceil T/n \rceil$ symbols and $n-T-\lfloor T/n \rfloor*n$ symbol groups thereafter may include $\lfloor T/n \rfloor$ symbols. A bit value 0 indicates that PDSCH is not assigned to a symbol group corresponding to the corresponding bit and a bit value 1 indicates that PDSCH is assigned to a symbol group corresponding to the corresponding bit.

In the above example, a portion of the time domain resources scheduled when PDSCH is scheduled indicates UL, but the above example is sufficiently applicable to a situation where a portion of the time domain resources scheduled when PUSCH is scheduled indicates DL.

Figure 12:
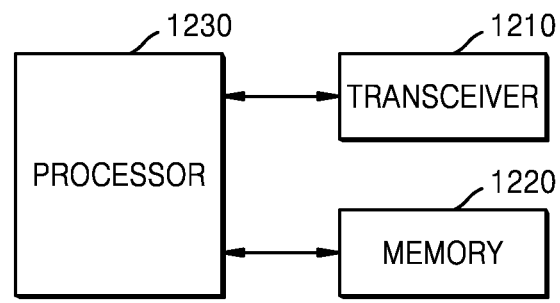
FIG. 12 illustrates a block diagram of a structure of a UE, according to some embodiments of the disclosure.

FIG. 12 illustrates a block diagram of a structure of a UE, according to some embodiments of the disclosure.

Referring to FIG. 12, the UE may include a transceiver 1210, a memory 1220, and a processor 1230. The transceiver 1210, the memory 1220, and the processor 1230 of the UE may operate according to a communication method of the UE described above. However, the components of the UE are not limited thereto. For example, the UE may include more or less components than those shown in FIG. 12. In addition, the transceiver 1210, the memory 1220, and the processor 1230 may be implemented in a form of one chip.

The transceiver 1210 may transmit or receive a signal to or from a base station. Here, the signal may include control information and data. In this regard, the transceiver 1210 may include an RF transmitter up-converting and amplifying a frequency of a transmitted signal and an RF receiver performing low noise amplification and down-converting a frequency of a received signal. However, this is only an example of the transceiver 1210 and the components of the transceiver 1210 are not limited to the RF transmitter and the RF receiver.

Also, the transceiver 1210 receives and outputs a signal to the processor 1230 through a wireless channel, and transmits a signal output from the processor 1230 through a wireless channel.

The memory 1220 may store programs and data required for operations of the UE. Also, the memory 1220 may store control information or data included in a signal obtained by the UE. The memory 1220 may be configured in storage medium, such as ROM, RAM, a hard disk, CD-ROM, or DVD, or a combination thereof.

The processor 1230 may control a series of processes enabling the UE to operate according to the embodiments of the disclosure described above. According to an embodiment of the disclosure, the processor 1230 may receive control information regarding time domain resource assignment of a data channel from the base station, and determine time domain resource assignment of the data channel based on the received control information.

Figure 13:
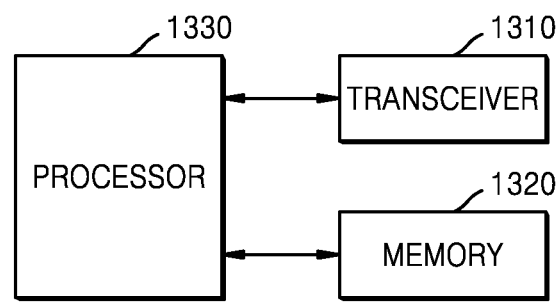
FIG. 13 illustrates a block diagram of a structure of a base station, according to some embodiments of the disclosure.

FIG. 13 illustrates a block diagram of a structure of a base station, according to some embodiments of the disclosure.

Referring to FIG. 13, the base station may include a transceiver 1310, a memory 1320, and a processor 1330. The transceiver 1310, the memory 1320, and the processor 1330 of the base station may operate according to a communication method of the base station described above. However, the components of the base station are not limited thereto. For example, the base station may include more or less components than those shown in FIG. 13. In addition, the transceiver 1310, the memory 1320, and the processor 1330 may be implemented in a form of one chip.

The transceiver 1310 may transmit or receive a signal to or from a UE. Here, the signal may include control information and data. In this regard, the transceiver 1310 may include an RF transmitter up-converting and amplifying a frequency of a transmitted signal and an RF receiver performing low noise amplification and down-converting a frequency of a received signal. However, this is only an example of the transceiver 1310 and the components of the transceiver 1310 are not limited to the RE transmitter and the RF receiver, Also, the transceiver 1310 receives and outputs a signal to the processor 1330 through a wireless channel, and transmits a signal output from the processor 1330 through a wireless channel.

The memory 1320 may store programs and data required for operations of the base station. Also, the memory 1320 may store control information or data included in a signal obtained by the base station. The memory 1320 may be configured in storage medium, such as ROM, RAM, a hard disk, CD-ROM, or DVD, or a combination thereof.

The processor 1330 may control a series of processes enabling the base station to operate according to the embodiments of the disclosure described above. According to an embodiment of the disclosure, the processor 1330 may perform scheduling for time domain resource assignment of a data channel and transmit control information regarding the time domain resource assignment of the data channel to the UE.

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software may be stored in random access memory (RAM), non-volatile memory including flash memory, read-only memory (ROW electrically erasable programmable read-only memory (EE-PROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the above described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, a portion of one embodiment and a portion of another embodiment of the disclosure may be combined with each other to enable a base station and a UE to operate. Also, the embodiments of the disclosure are presented based on an NR system, but other modifications based on technical ides of the embodiments of the disclosure may be implemented in other systems such as an FDD or TDD LTE system.

One or more embodiments of the disclosure may effectively provide a service in a wireless communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for time domain resource assignment in a wireless communication system, the method comprising:
   receiving a higher layer signaling configuring reference information for a start and length indicator value (SLIV),
   wherein the reference information enables the UE to use a starting symbol of a control resource for monitoring a physical downlink control channel (PDCCH) for identifying a starting symbol allocated for a physical downlink shared channel (PDSCH);
   receiving the PDCCH including downlink control information (DCI) scheduling the PDSCH;
   in case that a first PDSCH mapping type is configured, identifying the starting symbol of symbols allocated for the PDSCH, based on the reference information and the starting symbol of the control resource for monitoring the PDCCH where the DCI is detected;
   in case that a second PDSCH mapping type is configured, identifying the starting symbol of symbols allocated for the PDSCH, based on a starting symbol of a slot; and
   identifying resources allocated for the PDSCH, based on the identified starting symbol.

2. The method of claim 1,
   wherein the second PDSCH mapping type is a PDSCH mapping type A.

3. The method of claim 2, wherein the first PDSCH mapping type is a PDSCH mapping type B.

4. The method of claim 1, wherein the higher layer signaling comprises a radio resource control (RRC) signaling.

5. The method of claim 1, wherein identifying the starting symbol is further based on a type of a radio network temporary identifier (RNTI) scrambled to the DCI.

6. A user equipment (UE) for time domain resource assignment in a wireless communication system, the UE comprising:
- a transceiver; and
- at least one processor coupled to the transceiver and configured to:
  - receive a higher layer signaling configuring reference information for a start and length indicator value (SLIV),
  - wherein the reference information enables the UE to use a starting symbol of a control resource for monitoring a physical downlink control channel (PDCCH) for identifying a starting symbol allocated for a physical downlink shared channel (PDSCH);
  - receive the PDCCH including downlink control information (DCI) scheduling the PDSCH;
  - in case that a first PDSCH mapping type is configured, identify the starting symbol of symbols allocated for the PDSCH, based on the reference information and the starting symbol of the control resource for monitoring the PDCCH where the DCI is detected;
  - in case that a second PDSCH mapping type is configured, identify the starting symbol of symbols allocated for the PDSCH, based on a starting symbol of a slot; and
  - identify resources allocated for the PDSCH, based on the identified starting symbol.

7. The UE of claim 6, wherein the second PDSCH mapping type is a PDSCH mapping type A.

8. The UE of claim 6, wherein the first PDSCH mapping type is a PDSCH mapping type B.

9. The UE of claim 6, wherein the higher layer signaling comprises a radio resource control (RRC) signaling.

10. The UE of claim 6, wherein identifying the starting symbol is further based on a type of a radio network temporary identifier (RNTI) scrambled to the DCI.

11. A method performed by a base station for time domain resource assignment in a wireless communication system, the method comprising:
- transmitting, to a user equipment (UE), a higher layer signaling configuring reference information for a start and length indicator value (SLIV),
- wherein the reference information enables the UE to use a starting symbol of a control resource for monitoring a physical downlink control channel (PDCCH) for identifying a starting symbol allocated for a physical downlink shared channel (PDSCH); and
- transmitting, to the UE, the PDCCH including downlink control information (DCI) scheduling the PDSCH,
- wherein, in case that a first PDSCH mapping type is configured, the starting symbol of symbols allocated for the PDSCH is identified at the UE, based on the reference information and the starting symbol of the control resource for monitoring the PDCCH where the DCI is detected,
- wherein, in case that a second PDSCH mapping type is configured, the starting symbol of symbols allocated for the PDSCH is identified at the UE, based on a starting symbol of a slot, and
- wherein resources allocated for the PDSCH are identified at the UE, based on the identified starting symbol.

12. The method of claim 11, wherein the second PDSCH mapping type is a PDSCH mapping type A.

13. The method of claim 12, wherein the first PDSCH mapping type is a PDSCH mapping type B.

14. The method of claim 11, wherein the higher layer signaling comprises a radio resource control (RRC) signaling.

15. The method of claim 11, wherein the starting symbol is identified further based on a type of a radio network temporary identifier (RNTI) scrambled to the DCI.

* * * * *